(12) United States Patent
Roper, Jr. et al.

(10) Patent No.: US 12,358,642 B2
(45) Date of Patent: Jul. 15, 2025

(54) SECURITY SYSTEM FOR AN UNMANNED VEHICLE

(71) Applicant: Istari Digital, Inc., Charleston, SC (US)

(72) Inventors: William Roper, Jr., Charleston, SC (US); Christopher Benson, Charleston, SC (US); Long N. Phan, Charleston, SC (US); Thomas A. Campbell, Evergreen, CO (US); Paul A. DeBitetto, Concord, MA (US); Sanjay Emani Sarma, Malden, MA (US)

(73) Assignee: Istari Digital, Inc., Charleston, SC (US)

( * ) Notice: Subject to any disclaimer, the term of this patent is extended or adjusted under 35 U.S.C. 154(b) by 373 days.

(21) Appl. No.: 17/903,730

(22) Filed: Sep. 6, 2022

(65) Prior Publication Data

US 2024/0076056 A1 Mar. 7, 2024

(51) Int. Cl.
*B64D 45/00* (2006.01)
*B64D 27/02* (2006.01)
(Continued)

(52) U.S. Cl.
CPC ......... *B64D 45/0015* (2013.01); *B64D 27/24* (2013.01); *B64D 35/00* (2013.01);
(Continued)

(58) Field of Classification Search
CPC .... B64D 45/0015; B64D 27/24; B64D 35/00; B64D 27/026; B64U 10/16; B64U 50/13;
(Continued)

(56) References Cited

U.S. PATENT DOCUMENTS 8,229,984 B2 7/2012 Khader et al.
8,296,563 B2 10/2012 Tu et al.
(Continued)

FOREIGN PATENT DOCUMENTS

EP 3920051 12/2021
EP 4178155 5/2023
(Continued)

OTHER PUBLICATIONS

US 11,061,891 B2, 07/2021, Yan (withdrawn)
(Continued)

*Primary Examiner* — Paul Danneman
(74) *Attorney, Agent, or Firm* — Fish & Richardson P.C.

(57) ABSTRACT

An unmanned vehicle includes at least one navigation sensor configured to measure navigation data indicative of an environment, at least one status sensor configured to measure status data indicative of operating parameters of a hardware system and a computing system. The computing system includes a navigation engine configured to receive the navigation data and status data and plan a path through the environment and a security engine. The security engine is configured to detect that an unauthorized user is attempting to access the navigation data or the status data, send an alert to an authorized user indicating that the unauthorized user is attempting to access navigation data or status data, and send, to the unauthorized user, simulated data including one or both of simulated navigation data and simulated status data.

34 Claims, 26 Drawing Sheets

(51) Int. Cl.
*B64D 27/24* (2024.01)
*B64D 35/00* (2006.01)
*B64U 10/16* (2023.01)
*B64U 50/13* (2023.01)
*B64U 50/19* (2023.01)
*G05D 1/00* (2006.01)
*G05D 1/10* (2006.01)
*H04L 9/40* (2022.01)
*B64U 101/17* (2023.01)

(52) U.S. Cl.
CPC .............. *B64U 10/16* (2023.01); *B64U 50/13* (2023.01); *B64U 50/19* (2023.01); *G05D 1/101* (2013.01); *H04L 63/1416* (2013.01); *B64D 27/026* (2024.01); *B64U 2101/17* (2023.01)

(58) Field of Classification Search
CPC .... B64U 50/19; B64U 2101/17; G05D 1/101; H04L 63/1416
See application file for complete search history.

(56) References Cited

U.S. PATENT DOCUMENTS

| | | | |
|---|---|---|---|
| 8,315,794 B1 | 11/2012 | Strelow et al. | |
| 8,627,484 B2 | 1/2014 | Beckley et al. | |
| 9,524,648 B1 | 12/2016 | Gopalakrishnan et al. | |
| 9,689,686 B1 | 6/2017 | Carmack et al. | |
| 9,725,171 B1 | 8/2017 | Carmack et al. | |
| 9,764,837 B2 | 9/2017 | Phan et al. | |
| 9,847,033 B1 | 12/2017 | Carmack et al. | |
| 9,849,978 B1 | 12/2017 | Carmack et al. | |
| 10,198,011 B2 | 2/2019 | DeBitetto et al. | |
| 10,437,953 B2 | 10/2019 | Irissou et al. | |
| 10,452,802 B2 | 10/2019 | Irissou et al. | |
| 10,708,068 B2 | 7/2020 | Cheng et al. | |
| 10,747,201 B2 | 8/2020 | Biernat et al. | |
| 10,764,160 B1 | 9/2020 | Shtrauch et al. | |
| 10,796,266 B2 | 10/2020 | Lamkin et al. | |
| 10,853,536 B1 | 12/2020 | Steingrimsson et al. | |
| 10,928,803 B2 | 2/2021 | Biernat et al. | |
| 10,984,016 B2 | 4/2021 | Gunther | |
| 11,055,279 B2 | 7/2021 | Yan | |
| 11,139,980 B2 | 10/2021 | Herrin et al. | |
| 11,144,540 B2 | 10/2021 | Yan | |
| 11,329,995 B2 | 5/2022 | Zhang | |
| 11,356,275 B2 | 6/2022 | Valdez et al. | |
| 11,429,565 B2 | 8/2022 | Kaguma et al. | |
| 11,468,048 B2 | 10/2022 | Yan | |
| 11,468,528 B2 | 10/2022 | Salvo et al. | |
| 11,475,176 B2 | 10/2022 | Glunz | |
| 11,481,651 B2 | 10/2022 | Donoho et al. | |
| 11,496,291 B2 | 11/2022 | Chakra et al. | |
| 11,544,291 B2 | 1/2023 | Iftemi | |
| 11,775,707 B1 | 10/2023 | Roper et al. | |
| 2003/0233418 A1 | 12/2003 | Goldman | |
| 2004/0217850 A1 | 11/2004 | Perttunen et al. | |
| 2010/0257581 A1 | 10/2010 | Leconte et al. | |
| 2011/0023016 A1 | 1/2011 | Khader et al. | |
| 2011/0032870 A1 | 2/2011 | Kumar | |
| 2012/0167207 A1 | 6/2012 | Beckley et al. | |
| 2013/0002477 A1 | 1/2013 | Dehnie et al. | |
| 2016/0091894 A1 | 3/2016 | Zhang et al. | |
| 2016/0299233 A1 | 10/2016 | Levien et al. | |
| 2017/0004662 A1* | 1/2017 | Gong | G07C 5/004 |
| 2017/0214701 A1 | 7/2017 | Hasan | |
| 2018/0011948 A1 | 1/2018 | Irissou et al. | |
| 2018/0011958 A1 | 1/2018 | Irissou et al. | |
| 2018/0060573 A1 | 3/2018 | Roger et al. | |
| 2018/0079516 A1* | 3/2018 | Phan | F01D 15/10 |
| 2018/0259341 A1* | 9/2018 | Aboutalib | G01C 21/1652 |
| 2018/0373866 A1 | 12/2018 | Sweeney et al. | |
| 2019/0199756 A1 | 6/2019 | Correnti et al. | |
| 2019/0340269 A1 | 11/2019 | Biernat et al. | |
| 2020/0169408 A1 | 5/2020 | Herrin et al. | |
| 2020/0213110 A1 | 7/2020 | Cage et al. | |
| 2020/0286049 A1 | 9/2020 | Basu et al. | |
| 2020/0380080 A1 | 12/2020 | Glunz | |
| 2020/0382961 A1* | 12/2020 | Shattil | H04L 43/18 |
| 2021/0075825 A1 | 3/2021 | Davis | |
| 2021/0103603 A1 | 4/2021 | Iftemi | |
| 2022/0038260 A1 | 2/2022 | Chakra et al. | |
| 2022/0092450 A1 | 3/2022 | Donoho et al. | |
| 2023/0132505 A1 | 5/2023 | Lee et al. | |

FOREIGN PATENT DOCUMENTS

| | | |
|---|---|---|
| GB | 2595984 | 12/2021 |
| WO | WO 2018163044 | 9/2018 |
| WO | WO 2019217323 | 11/2019 |

OTHER PUBLICATIONS

[No Author Listed], "Department of Defense Handbook, Airworthiness Certification Criteria," MIL-HDBK-516C 4.1.4 & 5.2 failure conditions, Dec. 12, 2014, 527 pages.

[No Author Listed], "Department of Defense Joint Service Specification Guide, Aircraft Structures," JSSG-2006, Oct. 30, 1998, 497 pages.

[No Author Listed], "EN 1090-part 1-5, Execution of steel structures and aluminum structures," European Standards, 2012, 7 pages (abstract only).

[No Author Listed], "IEC 60601-1-11:2015, Medical electrical equipment," International Organization for Standardization, Jan. 2015, 109 pages (abstract only).

[No Author Listed], "IEC 62304:2006, Medical device software, Software life cycle processes," International Organization for Standardization, May 2006, 151 pages (abstract only).

[No Author Listed], "ISO 10204:2017, Iron ores, Determination of magnesium, Flame atomic absorption spectrometric method," International Organization for Standardization, Jul. 2017, 14 pages (abstract only).

[No Author Listed], "ISO 10993-1:2018, Biological evaluation of medical devices, Part 1: Evaluation and testing within a risk management process," International Organization for Standardization, Oct. 2018, 41 pages (abstract only).

[No Author Listed], "ISO 11135:2014, Sterilization of health-care products, Ethylene oxide, Requirements for the development, validation and routine control of a sterilization process for medical devices," International Organization for Standardization, Jul. 2014, 78 pages (abstract only).

[No Author Listed], "ISO 11137-1:2006, Sterilization of health care products, Radiation," International Organization for Standardization, Apr. 2006, 37 pages (abstract only).

[No Author Listed], "ISO 11607-1:2019, Packaging for terminally sterilized medical devices," International Organization for Standardization, Feb. 2019, 44 pages (abstract only).

[No Author Listed], "ISO 13485:2016, Medical devices, Quality management systems, Requirements for regulatory purposes," International Organization for Standardization, Mar. 2016, 36 pages (abstract only).

[No Author Listed], "ISO 14004:2016 Environmental management systems, General guidelines on implementation," International Organization for Standardization, Mar. 2016, 59 pages (abstract only).

[No Author Listed], "ISO 14971:2019, Medical devices, Application of risk management to medical devices," International Organization for Standardization, Dec. 2019, 36 pages (abstract only).

[No Author Listed], "ISO 15223-1:2021, Medical devices, Symbols to be used with information to be supplied by the, manufacturer, Part 1: General requirements," International Organization for Standardization, Feb. 2022, 36 pages (abstract only).

[No Author Listed], "ISO 9001:2015, Quality management systems, Requirements," International Organization for Standardization, Sep. 2015, 29 pages (abstract only).

(56) References Cited

OTHER PUBLICATIONS

[No Author Listed], "ISO 9013:2017, Thermal cutting, Classification of thermal cuts, Geometrical product specification and quality tolerances," International Organization for Standardization, Feb. 2017, 28 pages (abstract only).

Cdsco.gov.in [online], "Central Drugs Standard Control Organization," available on or before Aug. 1, 2018, retrieved on Apr. 4, 2024, retrieved from URL<https://cdsco.gov.in/opencms/opencms/en/Home>, 1 page.

Cpsc.gov [online], "General Certificate of Conformity," available on or before Jan. 20, 2014, retrieved on Apr. 4, 2024, retrieved from URL<https://www.cpsc.gov/Business--Manufacturing/Testing-Certification/General-Certificate-of-Conformity>, 4 pages.

Iecee.org [online], "CB scheme," available on or before Feb. 21, 2023, retrieved on Apr. 4, 2024, retrieved from URL<https://www.iecee.org/who-we-are/cb-scheme>, 3 pages.

Medium.datadriveninvestor.com [online], "GPT Zero is Designed to Recognize Texts Written by AI," Jan. 12, 2023, retrieved on Mar. 15, 2024, retrieved from URL<https://medium.datadriveninvestor.com/gpt-zero-is-designed-to-recognize-texts-written-by-ai-ab7ff4d11fd6>, 7 pages (preview only).

Daubert et al., "HoneyDrone: A Medium Interaction Unmanned Aerial Vehicle Honeypot," NOMS 2018—2018 IEEE/IFIP Network Operations and Management Symposium, Apr. 2018, 6 pages.

International Search Report and Written Opinion in International Appln. No. PCT/US2023/73513, mailed on Nov. 20, 2023, 16 pages.

\* cited by examiner

SECURITY SYSTEM FOR AN UNMANNED VEHICLE

TECHNICAL FIELD

This disclosure relates to a security system for an unmanned vehicle, such as for a hybrid unmanned aerial vehicle.

BACKGROUND

Computing systems often have some security measures to prevent malicious users from accessing data of the computing system. Unauthorized users may pose as authorized users in order to retrieve data from the computing system or to send commands to the computing system to perform one or more actions.

SUMMARY

This document describes systems and methods for detecting that an unauthorized user, e.g., an unauthorized computing system, is attempting to access a computing system of an unmanned vehicle, such as an unmanned aerial vehicle (UAV), and for responding to the attempt to prevent the unauthorized user from gaining access to the unmanned vehicle. The unmanned vehicle is configured to deploy countermeasures when the unmanned vehicle detects communication with an unauthorized computing system. The unmanned vehicle continues to execute authorized commands (e.g., to navigate from a first location to a second location in a flight plan for a UAV), but prevents transmission of operational parameter values (e.g., system status data or other telemetry) to the unauthorized computing system. Typically, the unmanned vehicle instead performs a simulation of unmanned vehicle operations responsive to commands received from the unauthorized computing system. The unmanned vehicle sends simulated parameter values to the unauthorized computing system. The unmanned vehicle monitors, characterizes, and/or stores (e.g., locally and/or in a cloud computing system) data representing behavior of the unauthorized computing system. In this way, data about the attempted cyberattack are stored and analyzed by the unmanned vehicle or other authorized computing system and unmanned vehicle operations are uninterrupted.

The methods and systems described in this document convey one or more of the following advantages. The unmanned vehicle is able to monitor and classify the behavior of the unauthorized user without disrupting operation of the unmanned vehicle. The unmanned vehicle can monitor the behavior of the unauthorized user for a long period of time without the unauthorized user realizing that he has been detected and that he is receiving simulated data. This can discourage or prevent future attempts by unauthorized users to access and/or command the unmanned vehicle.

In an aspect, the unmanned vehicle includes a navigation engine that includes one or more processors configured to receive navigation data and status data and plan a path through the environment. The unmanned vehicle includes a security engine. The security engine includes one or more processors configured to detect that an unauthorized user is attempting to access the navigation data or the status data. The security engine is configured to send an alert to an authorized user indicating that the unauthorized user is attempting to access navigation data or status data. The security engine is configured to request simulated data including one or both of simulated navigation data and simulated status data from the navigation engine, wherein the simulated data is generated to correspond to commands received by the unauthorized user. The security engine is configured to select, from among the measured data and the simulated data, at least a portion of the simulated data for sending to the unauthorized user. The security engine is configured to send, to the unauthorized user, the selected simulated data including the one or both of the simulated navigation data and the simulated status data. The security engine is also configured to select, from among the measured data and the simulated data, at least a portion of the measured data and send, to the authorized user, the selected measured data. The navigation data is indicative of an environment of the unmanned vehicle. The status data is indicative of operating parameters of a hardware system of the unmanned vehicle.

Embodiments can include one or more of the following features.

In some implementations, the hardware system includes an engine configured to generate mechanical energy, a generator motor coupled to the engine and configured to generate electrical energy from the mechanical energy generated by the engine, and at least one rotor motor configured to drive at least one propeller of the unmanned vehicle to rotate. The at least one rotor motor is powered by the electrical energy generated by the generator motor. The navigation engine is powered by the electrical energy generated by the generator motor.

In some implementations, unmanned vehicle includes a storage including a plurality of security tiers, a first security tier of the plurality having a first level of data security and a second security tier having a second level of data security that has at least one additional security requirement relative to the first level of data security. The storage is configured to store the navigation data in the first security tier and the status data in the second security tier. In some implementations, the second level of data security of the second security tier includes at least one additional authentication requirement to access data stored in the second security tier relative to authentication requirements of the first level of data security of the first security tier. In some implementations, the second level of data security of the second security tier includes a requirement of physical access to the unmanned vehicle to access data stored in the second security tier, and where the first level of data security of the first security tier includes permission to remotely access data stored in the first security tier.

In some implementations, the security engine is further configured to monitor transmissions received from the unauthorized user and classify a type of a cyberattack being used by the unauthorized user. In some implementations, classifying the type of the cyberattack being used by the unauthorized user includes training a machine learning engine with training data including transmissions received during a plurality of different cyberattacks, inputting the transmissions received from the unauthorized user into the machine learning engine, and receiving, from the machine learning engine, data indicative of the type of the cyberattack being used by the unauthorized user.

In some implementations, the security engine includes a virtual machine. Sending the simulated data includes performing, in the virtual machine, a simulation of navigating the unmanned vehicle in response to data received from the unauthorized user to generate the simulation data, and sending the data received from the unauthorized user to the authorized user. In some implementations, performing the simulation of navigating the unmanned vehicle in response to data received from the unauthorized user to generate the simulation data can include simulating the unmanned vehicle using a digital twin of the unmanned vehicle, simulating an environment within which the unmanned vehicle exists, and navigating the digital twin of the unmanned vehicle within the simulated environment.

In some implementations, detecting that an unauthorized user is attempting to access the navigation data or the status data includes determining that the unmanned vehicle is deviating from a flight plan. In some implementations, detecting that an unauthorized user is attempting to access the navigation data or the status data includes determining that at least one value of the status data or the navigational data deviates from an acceptable range. In some implementations, the acceptable range can be user-specific and can be determined based on previous navigation data or previous status data associated with a particular authorized user. In some implementations, detecting that an unauthorized user is attempting to access the navigation data or the status data includes testing at least one status sensor or at least one navigational sensor to identify data spoofing. In some implementations, detecting that an unauthorized user is attempting to access the navigation data or the status data includes determining that a particular pattern of requests for navigational data or status data is indicative of a cyberattack.

In some implementations, the status data includes, at least one of temperature data, a voltage output, an electrical current output, vibrational data, tachometric output, and a log of control commands. In some implementations, the navigational data includes at least one of camera data, accelerometer data, gyroscopic data, ranging data, and global positioning system (GPS) coordinates.

In an aspect, a method for operating an unmanned vehicle includes receiving, by a computing system, navigation data indicative of an environment of the unmanned vehicle and status data indicative of operating parameters of a hardware system of the unmanned vehicle. The navigation data and the status data are measured data. The method further includes detecting, by the computing system, that an unauthorized user is attempting to access the navigation data or the status data and sending an alert to an authorized user indicating that the unauthorized user is attempting to access navigation data or status data. The method further includes generating simulated data including one or both of simulated navigation data and simulated status data, the simulated data being generated to correspond to commands received by the unauthorized user; selecting, from among the measured data and the simulated data, at least a portion of the simulated data for sending to the unauthorized user; and sending, to the unauthorized user, the simulated data including the one or both of the simulated navigation data and the simulated status data. The method further includes selecting, from among the measured data and the simulated data, at least a portion of the measured data and sending, to the authorized user, the selected measured data.

Embodiments can include one or more of the following features.

In some implementations, the hardware system includes an engine configured to generate mechanical energy, a generator motor coupled to the engine and configured to generate electrical energy from the mechanical energy generated by the engine, and at least one rotor motor configured to drive at least one propeller of the unmanned vehicle to rotate. The at least one rotor motor is powered by the electrical energy generated by the generator motor. The navigation engine is powered by the electrical energy generated by the generator motor.

In some implementations, the method includes storing, in a storage including a plurality of security tiers, the navigation data and the status data, the storage including a first security tier of the plurality having a first level of data security and a second security tier having a second level of data security that has at least one additional security requirement relative to the first level of data security. In some implementations, the storage is configured to store the navigation data in the first security tier and the status data in the second security tier. In some implementations, the second level of data security of the second security tier includes at least one additional authentication requirement to access data stored in the second security tier relative to authentication requirements of the first level of data security of the first security tier. In some implementations, the second level of data security of the second security tier includes a requirement of physical access to the unmanned vehicle to access data stored in the second security tier, and where the first level of data security of the first security tier includes permission to remotely access data stored in the first security tier.

In some implementations, the method includes monitoring, by the computing system, transmissions received from the unauthorized user, and classifying, by the computing system, a type of a cyberattack being used by the unauthorized user. In some implementations, classifying the type of the cyberattack being used by the unauthorized user includes training a machine learning engine with training data including transmissions received during a plurality of different cyberattacks, inputting the transmissions received from the unauthorized user into the machine learning engine, and receiving, from the machine learning engine, data indicative of the type of the cyberattack being used by the unauthorized user.

In some implementations, sending the simulated data includes performing, in a virtual machine of the computing system, a simulation of navigating the unmanned vehicle in response to data received from the unauthorized user to generate the simulation data, and sending the data received from the unauthorized user to the authorized user. In some implementations, performing the simulation of navigating the unmanned vehicle in response to data received from the unauthorized user to generate the simulation data can include simulating the unmanned vehicle using a digital twin of the unmanned vehicle, simulating an environment within which the unmanned vehicle exists, and navigating the digital twin of the unmanned vehicle within the simulated environment.

In some implementations, detecting that an unauthorized user is attempting to access the navigation data or the status data includes determining that the unmanned vehicle is deviating from a flight plan. In some implementations, detecting that an unauthorized user is attempting to access the navigation data or the status data includes determining that at least one value of the status data or the navigational data deviates from an acceptable range. In some implementations, the acceptable range can be user-specific and can be determined based on previous navigation data or previous status data associated with a particular authorized user. In some implementations, detecting that an unauthorized user is attempting to access the navigation data or the status data includes testing at least one status sensor or at least one navigational sensor to identify data spoofing. In some implementations, detecting that an unauthorized user is attempting to access the navigation data or the status data includes determining that a particular pattern of requests for navigational data or status data is indicative of a cyberattack.

In some implementations, the status data includes at least one of temperature data, a voltage output, an electrical current output, vibrational data, tachometric output, and a log of control commands. In some implementations, the navigational data includes at least one of camera data, accelerometer data, gyroscopic data, ranging data, and global positioning system (GPS) coordinates.

The details of one or more embodiments are set forth in the accompanying drawings and the description below. Other features and advantages will be apparent from the description and drawings, and from the claims.

DETAILED DESCRIPTION

Figure 1A:
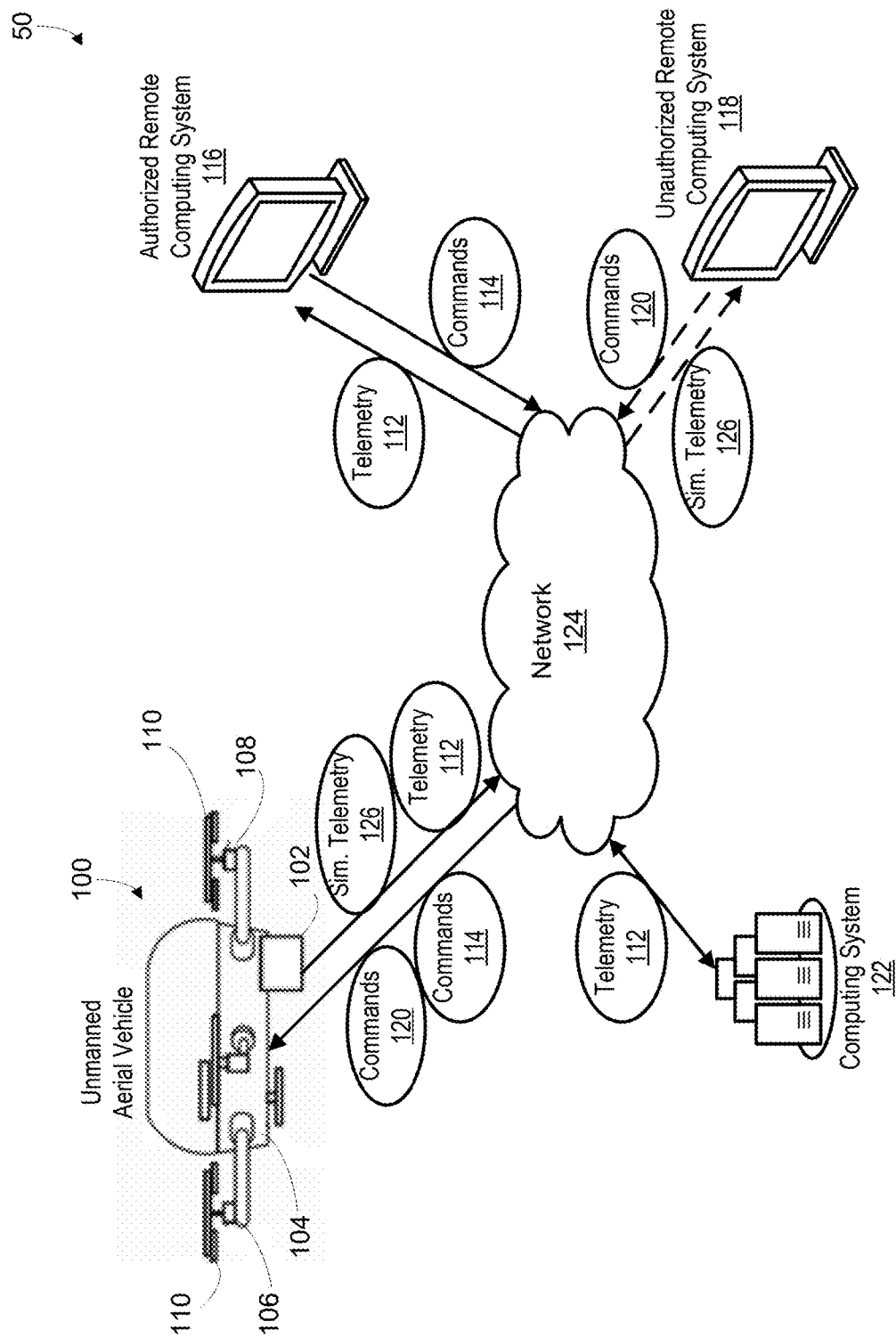
FIG. 1A shows an example computing environment of a UAV.

Described herein is a security system for an unmanned vehicle, such as an unmanned aerial vehicle (UAV). The security system enables the unmanned vehicle to detect and manage a cyberattack attempt by unauthorized computing systems (e.g., during a mission). In this description, when the unmanned vehicle is referred to as performing an action, it is understood that a computing system of the unmanned vehicle including one or more processors is executing one or more instructions and/or sending one or more commands to one or more other systems of the unmanned vehicle to perform the action. The security system includes a logic engine that is at least a part of the computing system of the unmanned vehicle. In some implementations, the unmanned vehicle is configured to detect that a cyberattack has been attempted, initiate a simulation of unmanned vehicle operation, and quarantine the cyberattack in the simulation while proceeding with operations (either autonomous or non-autonomous) that are authorized (e.g., intended, planned, scheduled, etc.) by a legitimate operator of the unmanned vehicle (e.g., the unmanned vehicle owner). For example, the unmanned vehicle is configured to resist attempts to access data from the unmanned vehicle by an unauthorized computing system. For example, the unmanned vehicle is configured to quarantine sensitive systems (e.g., data storage), ignore commands from an unauthorized computing system, track network data received from an unauthorized computing system, etc. while continuing nominal (e.g., intended, authorized, scheduled, etc.) operations.

Operations of the unmanned vehicle include, for example, navigating from a first location to a second location, or a series of locations, such as over long distances of several miles, dozens of miles, or over hundreds of miles. A navigation system, which forms at least a portion of the computing system, performs path-planning calculations to determine a route for the unmanned vehicle to take in order to navigate to a desired destination. The path planning calculations use data from pre-loaded maps and operation parameter values (e.g., sensor data) measured by one or more sensors mounted on the unmanned vehicle during flight in order to autonomously navigate the unmanned vehicle. In some implementations, the unmanned vehicle is configured to send data representing the operational parameters values during navigation from the first location to a second location to a remote computing device. The remote computing device is considered authorized if the remote computing device is permitted to send data to or receive data from the unmanned vehicle. Typically, an authorized computing device is operated or monitored by an authorized user of the unmanned vehicle, such as an unmanned vehicle owner, licensee, etc. As described below, the unmanned vehicle deploys countermeasures when the unmanned vehicle detects communication with an unauthorized computing system. The unmanned vehicle continues to execute authorized commands (e.g., to navigate from the first location to the second location) but prevents transmission of operational parameter values to the unauthorized computing system. Typically, the unmanned vehicle instead performs a simulation of unmanned vehicle operations responsive to commands received from the unauthorized computing system. The unmanned vehicle sends simulated parameter values to the unauthorized computing system. The unmanned vehicle monitors, characterizes, and/or stores (e.g., locally and/or in a cloud computing system) data representing behavior of the unauthorized computing system. In this way, data about the attempted cyberattack are stored and analyzed by the unmanned vehicle or other authorized computing system and unmanned vehicle operations are uninterrupted.

FIG. 1A shows an example computing environment 50 for an unmanned aerial vehicle (UAV) 100. The computing environment 50 includes a UAV 100, authorized remote computing system 116 (e.g., also authorized system or authorized user), unauthorized remote computing system 118 (e.g., also unauthorized system or unauthorized user), and a cloud computing system 122 (e.g., also "the cloud"), which are interconnected over a wireless network 124.

The UAV 100 includes a frame 104 to which multiple rotors 108 are coupled. Each rotor 108 is coupled to a propeller 110. In some implementations, the rotors 108 and propellers 110 are part of a hybrid generator system, as described in detail below with respect to FIGS. 5-9.

The UAV 100 includes a computing system which is configured to autonomously navigate the UAV. The computing system is electronically coupled to a sensor package 102 for collecting data about the local environment. The collected data are used for path selection and navigation. One or more types of sensing techniques may be employed by the computing system; for example, passive and/or active techniques may be used. For example, passive optical, thermal, etc., sensor technology may be used. Similarly, radar, LiDAR, etc. systems that transmit incident signals and collect reflected signals may be employed by the navigation system. The computing system includes one or more logic engines (described below in relation to FIG. 1B), configured to process both environmental data received from the sensor package of the UAV 100 and data stored in a storage of the UAV.

The computing system of the UAV 100 is configured to gather data about an environment of the UAV 100. The data gathered can be used for the computing system to determine the location of the UAV in the environment and for the computing system to plan a path for the UAV through the environment. For example, the computing system can be configured to recognize a navigation landmark for localization. In some implementations, the computing system includes many discrete sensors in the sensor package. For example, the sensor package of the computing system can include a global positioning system (GPS) receiver, an infrared (IR) sensor, a magnetic field sensor, a thermal sensor, radar, and electro-optical sensor, an auditory sensor, an accelerometer, a compass, a ranging sensor, a camera, or other such sensors for gathering environmental data. Possible sensors for the sensor package 102 are described in further detail with respect to FIG. 1B. In some implementations, one or more of the sensors included in the computing system may be positioned inside of the housing of the UAV 100 and one or more of the sensors may be positioned outside of the housing of the UAV 100, e.g., depending on the design and/or function of the sensor.

During operation (e.g., during navigation), sensors of the UAV 100 measure values of a plurality of operational parameters (also called parameters or sensor data). Operational parameters include one or more of Global Positioning System (GPS) data, local and global vehicle positions, vehicle heading, vehicle velocity, system voltage, and so forth. A list of example operating parameters and examples of corresponding source update rates for each of the operating parameters is included below in Table 1.

TABLE 1

List of example operating parameters and refresh rates

| Operating Parameter | Source Update Rate (Hz) |
|---|---|
| Telemetry Heartbeat | 1 |
| Flight Computer System Status | 1 |
| Vehicle Raw GPS Data | 1 |
| Vehicle Attitude | 50 |
| Vehicle Local Position | 50 |
| Vehicle Global Position | 50 |
| Vehicle Velocity | 50 |

TABLE 1-continued

List of example operating parameters and refresh rates

| Operating Parameter | Source Update Rate (Hz) |
|---|---|
| Vehicle Mission Waypoint | 10 |
| Vehicle Ground Speed | 10 |
| Vehicle Heading | 10 |
| Vehicle Propulsion Throttle | 10 |
| Vehicle Altitude AMSL | 1 |
| Vehicle Altitude AGL | 1 |
| Flight System Voltage | 1 |
| Flight System Output Current | 1 |
| ECU System Voltage | 10 |
| ECU Output Current | 10 |
| ECU Left Cylinder Head Temperature | 10 |
| ECU Right Cylinder Head Temperature | 10 |
| ECU Generator Temperature | 10 |
| ECU Rectifier Temperature | 10 |
| ECU Left Cooling Fan Output | 10 |
| ECU Left Cooling Fan Current | 10 |
| ECU Right Cooling Fan Output | 10 |
| ECU Right Cooling Fan Current | 10 |
| ECU Engine RPM | 10 |
| ECU Battery Charge Current | 10 |

The computing system of the UAV 100 can store the values of the operational parameters. The values of the operational parameters are used for operating the UAV 100 during a current mission, such as for navigation, controlling power usage, etc. In some implementations, values of the parameters are transmitted to one or more remote computing systems, such as the cloud computing system 122 and or the authorized remote computing system 116. The received values of the operational parameters of the UAV 100 are useful for monitoring UAV behavior during UAV operation, either autonomous, semi-autonomous, or non-autonomous. The operational parameter values are transmitted by the UAV in response to commands 114 received from the authorized user 116, either in response to commands during operation of the UAV 100 or as configured by the authorized user 116 before operation of the UAV. The commands 114 can include a request for telemetry 112 from the UAV, instructions to change operation of the UAV, and so forth. When the operational parameters are transmitted during operation of the UAV 100, they are wirelessly transmitted over the network 124 as telemetry 112. Generally, telemetry refers to data collected by an automated communications process at remote or inaccessible points (e.g., by the UAV 100 sensors 102) and transmitted to receiving equipment (e.g., an authorized user 116) for monitoring. The network 124 over which the telemetry 112 is transmitted can include conventional communications networks, such as telecommunications networks and the Internet.

An authorized remote computing system 116 can include any computing system of an authorized user of the UAV 100. For example, an authorized user can include an owner, licensee, or any user that is permitted to send or receive data to or from the UAV 100 (e.g., over network 124). The authorized user 116 is permitted to control the UAV 100 by sending authorized commands 114, schedule a mission for the UAV, monitor the telemetry of the UAV, and otherwise interact with the UAV over the network 124.

An unauthorized remote computing system 118 includes any computing system of an unauthorized user of the UAV 100. An unauthorized user 118 is any user that does not have permission to control the UAV 100, monitor telemetry 112 of the UAV, or interact with the UAV (e.g., over network 124). For example, the unauthorized user 118 can include users intending to take over control of the UAV from an authorized user 116. For example, the unauthorized user can include users intending to monitor the telemetry 112 of the UAV 100 (e.g., over network 124) without permission from the authorized user 116. The unauthorized user 118 thus accesses or attempts to access the UAV 100 over the network 124 without permission from an authorized user 116 of the UAV 100.

The UAV 100 is configured to detect that an unauthorized user 118 is attempting to access the UAV 100 or that an unauthorized user has accessed the UAV. In response to this detecting, a security system of the UAV 100 is configured to prevent the unauthorized user 118 from accessing telemetry 112 from the UAV 100 or from sending unauthorized commands 120 to the UAV to change the behavior of the UAV. In this way, the security system is configured to ensure that only authorized commands 120 are followed by the UAV and that operations of the UAV are not disrupted. The detection of an unauthorized user 118 by the UAV 100 and the UAV response are described further with respect to FIG. 1B.

The computing system 122 (also cloud 122) is a remote computing system configured to be in communication with the UAV 100 and the authorized user 116 over the network 124. The cloud 122 includes one or more networked computing devices configured to provide off-loaded processing and storage of data related to operation of the UAV 100. In some implementations, the UAV 100 is in communication with the cloud 122 during operation using high-bandwidth communications to permit telemetry 112 to be transmitted to the cloud for real-time or near real-time use in UAV operations. In some implementations, telemetry 112 that the UAV 100 collects and transmits over the network 124 can be stored at the cloud 122 and/or distributed to other computing systems. In some implementations, some computations for operation of the UAV 100 and/or the security system of the UAV 100 are performed at the cloud 122, as described below in relation to FIG. 1B. In some implementations the computing system 122 is not a cloud computing system, but a networked computing system that is configured to communicate with the UAV 100 before, during, and/or after operation of the UAV.

The UAV 100 is described as a case study for the security system throughout this disclosure. However other types of autonomous vehicles can include the security system described in this disclosure. For example, self-driving cars can be similarly equipped with a security system as described in this disclosure. The telemetry 112 and simulated telemetry 126 of a self-driving car can include one or more of the operating parameters of Table 1 in addition to other operating parameters specific to self-driving cars. For example, rather than including a hybrid generator system 500 including an electronic control unit (ECU) 512, a self-driving car can include a conventional-combustion engine, hybrid propulsion system, or electric motor. Various metrics of these systems can be included as parameters in the telemetry 112 and simulated telemetry 126. The security system described in this disclosure could be a part of any autonomous vehicle, such as a boats, submersibles, aircraft, trucks, etc.

In other words, the UAV 100 is described in detail to show how different parameters (e.g., operational parameters data 178 of Table 1) and navigation data 176 (described in relation to FIG. 1B) can have different security tiers, how they can be presented in a simulation to the unauthorized user 118, and so forth. However, for other types of autonomous vehicles, while the particular operational parameters data 178 and navigation data 176 can be different than those listed in this disclosure, the security system can operate in a similar manner for those other vehicle types by simulating the data required for those other vehicle types in a virtual machine (e.g., virtual machine 140). Detection of and response to unauthorized access (or attempts of access) for other vehicle types can be handled in a similar way as for the UAV 100.

Figure 1B:
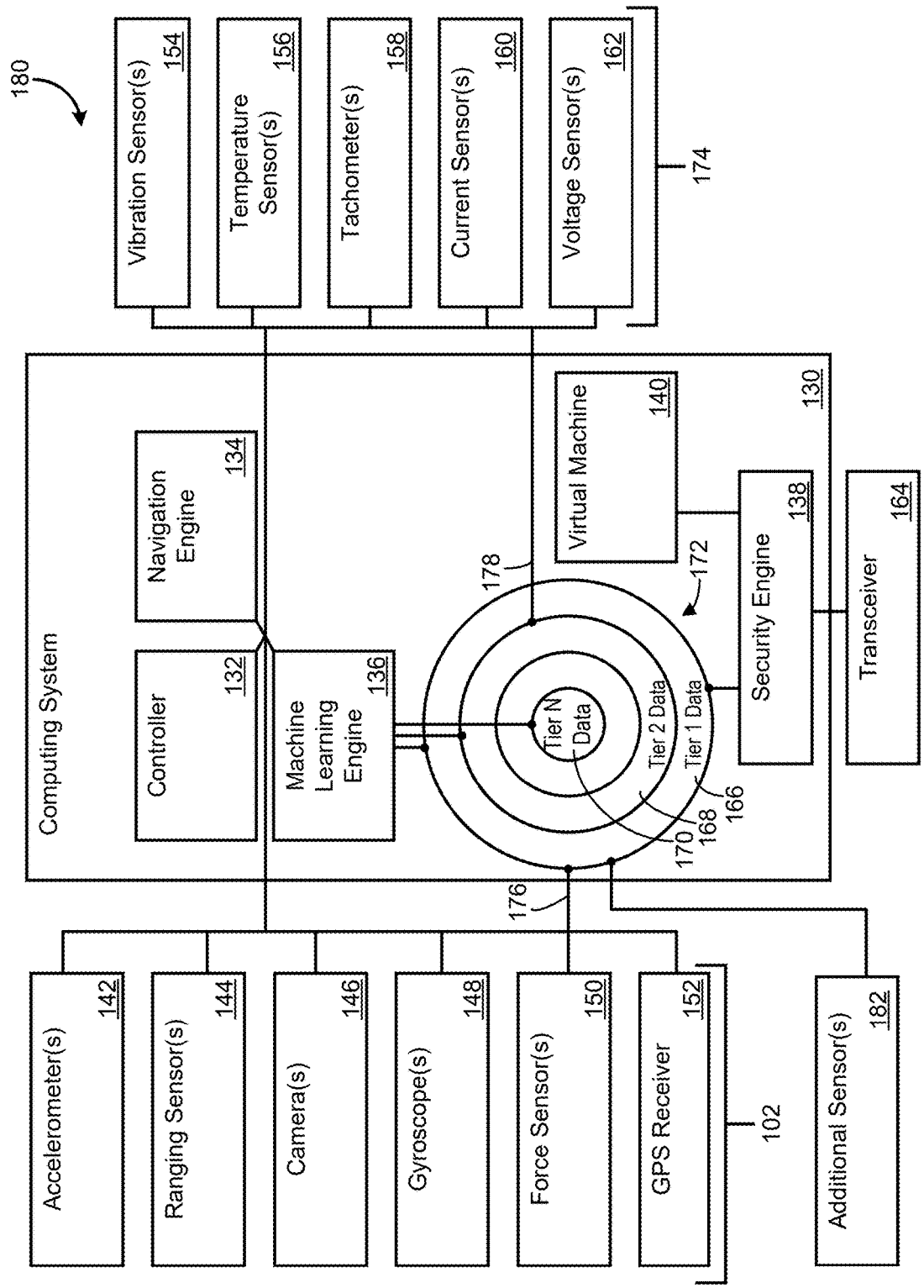
FIG. 1B shows an example unmanned vehicle system.

Turning to FIG. 1B, an example electronic system 180 of the UAV 100 is shown. The electronic system 190 of the UAV 100 includes a plurality of sensors 102, 174 and a computing system 130. The electronic system 180 shown in FIG. 1B is not comprehensive. For example, FIG. 1B does not show an example of a power system of the UAV 100, which may include a hybrid generator system. The power system of the UAV 100 provides electrical power to the plurality of sensors, the computing system 130, and the other elements of the UAV 100, such as the rotors 108. Examples of the hybrid generator system of the UAV 100 are described in further detail below with respect to FIGS. 5-9.

The plurality of sensors of the UAV 100 include navigational sensors 102. The navigational sensors can include one or more accelerometers 142, one or more ranging sensors 144 (e.g., LiDAR, LaDAR, etc.), one or more cameras 146, one or more rotation sensors 148 (e.g., gyroscopes), one or more force sensors 150 (e.g., strain sensors), a Global Positioning System (GPS) position receiver 152, and/or a transceiver 164.

The navigation sensors 102 provide data to the computing system 130 to assist the computing system 130 of the UAV 100 in conducting navigation from a first location to a second location (or other operations of the UAV). The accelerometers 142 provide acceleration data. The ranging sensors 144 provide data indicating range from the UAV 100 to one or more objects in the environment of the UAV. For example, the ranging sensors can provide range to obstacles, other UAVs, etc. to assist the UAV in path-planning and navigation. The cameras 146 can provide image data and/or video data of the environment of the UAV 100. Image processing can be performed by the computing system 130 to extract features from the images captured by the cameras 146 to navigate the UAV. The gyroscope 158 provides pitch, roll, and/or yaw data to the computing system 130 to assist in navigation and/or flight control. The force sensor(s) 150 provides data indicating a payload weight that is being carried by the UAV 100, which can impact fuel use, operational range, top speed, turn radius, and other navigation aspects. The GPS receiver 152 can provide GPS coordinates for use in global and/or local maps of the UAV during navigation. In some implementations, the UAV 100 is instructed to navigate to a series of GPS waypoints, and so the GPS receiver provides the position of the UAV 100 in the GPS coordinate system. The transceiver 164 is configured to send data to and receive data from remote computing systems, such as the cloud 122 and the authorized user 116, e.g., over network 124. In some implementations, the transceiver 164 includes a high-bandwidth system for outsourcing some real-time operations of navigation (or UAV simulation) to the cloud 122. For example, the transceiver 164 can include a serial radio. The transceiver is configured to send telemetry 112 and receive commands 114 over the network 124. The transceiver 164 is electronically connected to the computing system 130 so that data from the storage 172 can be transmitted by the transceiver.

The data provided by the sensors 102 includes operational parameters such as local and global position data (e.g., for local and global maps of the UAV, respectively); time data; pitch, roll, and yaw data; loading data (e.g., how heavy a payload is transported by the UAV); images of the environment of the UAV; acceleration and velocity of the UAV; ranging of the UAV to other features of the environment of the UAV; time stamps of when each value of an operational parameter was measured, and so forth. The values of navigation operational parameters (also called navigation data 176) provided by the navigation sensors 102 of the UAV 100 can be stored locally in a storage 172 of the UAV. The navigation data 176 can be stored at different security levels, as described further below. The level of security of the navigation data 176 can determine whether the navigation data are transmitted as telemetry 112 or whether the data are secured locally on the UAV 100. In some implementations, the navigation data 176 are transmitted to an authorized user 116 and/or to the cloud 122 over the network 124 as telemetry 112, as described above. In some implementations, the navigation data 176 are not transmitted, e.g., for security reasons, as described below.

In addition to the sensors 102 for navigation, the UAV 100 includes status sensors 174 for monitoring operation of each of one or more elements of the UAV 100. For example, the UAV 100 includes a power system that can include a hybrid generator. As described below, the hybrid generator can include one or more batteries, an engine, and electronics for converting power from the engine (e.g., a combustion engine, a turbine, etc.) and charging the one or more batteries. The status sensors 174 are configured to monitor the hybrid generator or other power system of the UAV 100. For example, the status sensors 174 include temperature sensors 156, tachometers 158, electronic current sensors 160, and/or voltage sensors 162. Additionally, the status sensors 174 can include one or more sensors to monitor the other operational parameters of the UAV 100 related to the pose of the UAV and the monitoring of the hardware systems of the UAV. For example, the status sensors 174 can include one or more of the navigational sensors 102 (e.g., a gyroscope 148, an accelerometer 142, a force sensor 150, etc.). The status sensors 174 can include vibration sensors 154, and/or temperature sensors 156. Such sensors can be monitored to determine whether the UAV is flying on course, is level and/or stable, and that the payload/planned navigation route do not exceed operational capacity of the power system.

The status sensors 174 monitor the values of various operational parameters during operation of the UAV 100. For example, the vibration sensors 154 can determine whether an engine of the UAV 100 is causing vibrations over a threshold level that might be deemed safe and/or stable for further operation of the UAV. For example, several operational parameters of an Engine Control Unit (ECU) 512 are monitored. The temperature sensors 156 monitor temperatures of one or more UAV 100 systems, such as heat sink temperatures, electronic rectifier heat, processor heat of the computing system, engine cylinder head temperatures (if applicable), and so forth. The tachometers 158, which can include shaft encoders, can monitor the rotations per minute (RPM) of various systems of the UAV including engine RPM (if applicable), cooling fan RPM, propeller 110 RPM, etc. The current sensors 160 monitor a battery charge current (e.g., for a hybrid generator, how much the batteries are being charged by the engine), battery output current, output currents of one or more ports of the computing system 130, output current of the ECU, and so forth. The voltage sensors 162 monitor a charge or voltage of the one or more batteries (e.g., of a hybrid generator or of a fully electric power system), a system voltage of the computing system 130, a voltage of the ECU, and so forth. The measured values of the status operational parameters (also called status data 178 or status values) are sent to the computing system 130 of the UAV 100. The status data 178 are stored locally on the UAV 100 in storage 172. In some implementations, the status data 178 are stored with a different security level than the navigation data 176, as described in further detail below. The status data 178 can be selectively transmitted as telemetry 112 to a remote computing system such as the cloud 122 or to an authorized user 116. In some implementations, portions of the status data 178 or all of the status data are never transmitted as telemetry 112 (e.g., to maintain data security).

In addition to the sensors 102 for navigation and the status sensors 174, the UAV can include additional sensors 182 that are configured to provide other data to the UAV 100 than what is described above. In this respect, the UAV 100 can include an interface for modular "plug and play" sensing capability. One or more sensors 102, 176 can be removed, or additional sensor(s) 182 can be added to the UAV 100. The security engine 138, virtual machine 140, and machine learning engine 136 can be configured to be adaptable to additional data received from the additional sensors 182. For example, when a simulation is performed (e.g., on the virtual machine 140), the data of the additional sensors 182 are simulated in addition to the sensors 102, 174 (as subsequently described).

The computing system 130 includes one or more processing devices configured to execute the logic of a plurality of computing engines (e.g., computing modules, processes, etc.). The computing system 130 is configured to read data from the sensors 102, 174, and 182 and from the storage 172 in order to control the UAV 100 and execute one or more commands 114 or other instructions of the UAV. The computing system 130 includes a controller 132, a navigation engine 134, a machine learning engine 136, a security engine 138, a virtual machine 140, and storage 172 for storing data of the UAV 100.

The security engine 138 is configured to determine whether the UAV 100 is operating as intended or whether the UAV 100 is being attacked by an unauthorized user 118. The security engine 138 is configured to detect an attack by the unauthorized user 118 of the UAV 100. The security engine 138 is configured to respond to the detected attack by the unauthorized user 118. The security engine 138 is configured to analyze data received from remote computing systems (e.g., cloud 122, authorized user 116, and/or unauthorized user 118) by way of the transceiver 164. The security engine 138 is also configured to analyze the data from the sensors 102, 174 and storage 172.

If the security engine 138 determines that the UAV 100 is being accessed by an unauthorized user 118, is receiving unauthorized commands 120, or is otherwise experiencing an attempted hack or security threat, the security engine restricts access to the UAV 100 systems (e.g., the controller 132, navigation engine 134, storage 172, and so forth) to remote computing systems until secure communications can be reestablished. In some implementations, the security engine 138 switches the unauthorized user 118 that is accessing the UAV 100 to receive simulated telemetry 126 from the virtual machine 140. More detail with respect to detection and response of access by an unauthorized user 118 is described in relation to FIG. 2, below.

The controller 132 is configured to control flight of the UAV 100 by managing processes of the hardware systems of the UAV 100, such as sensors 102, 174, transceiver 164, the power system (e.g., hybrid generator 500 described in relation to FIG. 5), and so forth. For example, the controller 132 receives data from the sensors 102, 174, the transceiver 164, and the storage 172 to control rotors 108 for steering the UAV 100 along a planned path. The controller 130 communicates with the navigation engine 134, machine learning engine 136, and security module 138 during UAV 100 operations in order to determine how to control the hardware systems of the UAV. In some implementations, if the vehicle being controlled is not a UAV 100 but another type of autonomous vehicle, the hardware systems can include the power systems, propulsion systems, and sensor packages of that autonomous vehicle.

The navigation engine 134 is configured to execute logic for navigating the UAV 100 through an environment. The navigation engine 134 receives data from the sensors 102, 174 and, in some implementations, data from the machine learning engine 136 in order to determine what path the UAV 100 should follow. For example, the navigation engine 134 may receive data from the camera 146 indicative of a feature of the environment to which the UAV is instructed to navigate. The machine learning engine 136 can receive the data from the camera 146 and extract the feature from the image or otherwise determine that the feature is present in the image. The machine learning engine 136 and camera 146 send data to the navigation engine, which determines that there are no obstacles between the UAV 100 and the feature, and thus plans a path toward the feature. The navigation engine 134 passes data representing the desired heading to the controller 132, which converts this data to motor commands for the rotors 108. This is a simplified example, but it illustrates the relative responsibilities of the machine learning engine 136, controller 132, and navigation engine 134 for operating the UAV 100. The navigation engine 134 can receive data from any one of the sensors 102, 174 and/or from storage 172 for navigating the UAV 100 through the environment. In some implementations, the UAV 100 can navigate by extracting features from the environment across multiple spectra (magnetic, thermal, visible light, etc.), as further described in U.S. application Ser. No. 16/029,383, incorporated herein in entirety by reference.

The machine learning engine 136 includes hardware and/or software for configuring and executing machine learning actions such as classification of features included in data received from the sensors 102, 174, the transceiver 164, and/or the storage 174.

In a navigation context, the machine learning engine 136 facilitates navigation actions such as building a local map of the UAV 100 environment. The machine learning engine 136 can be configured to compare the local map to a preloaded global map. For example, the multi-spectral data that is gathered by the UAV can be used to build a codified map that designates positions of data signatures for multiple spectra in relation to one another. A deep learning neural network framework can be used to generate the local map. For example, data signatures can be programmed into synapses of a neural network layer, e.g., by a particular weighting configuration of the layer. When data is detected, the data can be sent through the neural network layer, and the data signature can be quickly recognized and added to the local map of the UAV 100. Generating the local map increases navigational accuracy, such as over intrinsic GPS inaccuracies. The local map can be used for navigation, such as if GPS service is disrupted.

In a security context, the machine learning engine 136 is configured to facilitate detection and classification of attempted intrusion by the unauthorized user 118. The machine learning engine 136 can receive data from the unauthorized user 118 by way of the security engine 138 and analyze one or more characteristics of the data. The machine learning engine 136 can classify, from the one or more characteristics, the identity of the unauthorized user 118, a type of attack, a location of the unauthorized user 118, computing system characteristics of the unauthorized user 118, and so forth. This helps the security engine 138 recognize patterns in future attacks by unauthorized users and helps the security engine 138 develop countermeasures to quickly detect and response to future attacks. In some implementations, the machine learning engine 136 can be trained to be user-specific, such that authorized users 116 can be identified based on unique characteristics of how the authorized user 116 typically interacts with UAVs (e.g., the UAV 100). For example, the machine learning engine 136 can be trained to identify typical sequences of commands, types of commands, frequency of commands, etc. associated with a particular authorized user 116 (e.g., based on previous mission data) and can detect suspicious activity based on deviations from such interactions. In this way, each individual authorized user's unique "style" of interacting with UAVs can be used to identify an unauthorized user 118 posing as the authorized user 116.

The storage 172 of the computing system 130 includes means for storing data received from the sensors 102, 174, commands from remote computing systems, or any other data as desired. The storage 172 includes a segmented database that has a plurality of tiers. A first tier 166 is configured to store the least secure data of the storage 172. A second tier 168 is configured to be more secure than the first tier 166. An nth tier 170 is configured to store the most secure data of the UAV 100. The tiers 166, 168, 170 are segmented from one another. For example, access to data of tier 1 166 does not necessarily include access to data 168, 170 of tiers 1-N. The tiers 166, 168, 170 can include physically distinct hardware with respect to each other and/or can include software barriers between one another. For example, the tiers 1-N can each be a separate database. For example, tiers 1-N can each have addresses that are associated with different security levels (e.g., different passwords, authorization requirements, etc.).

The tiers 1-N of the storage 172 are designed to limit access by remote computing systems (each of authorized user 116, unauthorized user 118, and the cloud 122) from accessing particular data used during operation of the UAV 100. As such, in case of temporary access by an unauthorized user 118, data stored in particular tiers (e.g., tier N) are inaccessible to the remote computing system, and the unauthorized user 118 must physically acquire the UAV 100 to attempt to access this data. Even in such situations, the data in the more secure tiers may require particular tools and/or credentials to access that are only available to an authorized user 116. For example, data 176 from navigation sensors 102 is stored in tier 1, while data 178 from status sensors 174 is stored in tier 2. In some implementations, even authorized user 116 may not have access to all data collected by sensors 102, 174. When telemetry is requested by the authorized user 116, the appropriate credentials are verified and the data from the respective tiers is transmitted to the authorized user 116.

The virtual machine 140 includes a system for simulating the UAV 100. The virtual machine includes simulations of one or more of the navigation sensors 102 and in some cases the status sensors 174. In some implementations, the virtual machine 140 can include a simulation of the entire UAV 100. The simulation of the UAV 100 can be a "digital twin" of the UAV 100 and can be designed to represent the UAV 100 with high fidelity to be as similar as possible to the UAV 100. For example, the simulation can include actual hardware, software, controllers, and other avionics systems used on the UAV 100. Physics-based models can account for as-built physical and aerodynamic properties of flight vehicles. The digital twin of the UAV 100 can also exist within a simulated environment corresponding to the physical environment that the UAV 100 exists within. The simulated environment can be a physics-based simulation and can be designed with high fidelity such that the simulated telemetry 126 corresponding to the digital twin is as close as possible to telemetry that would be produced by the UAV 100 if the UAV 100 responded to commands from the unauthorized user in the physical environment. The simulated environment can be implemented as part of the virtual machine 140 of the UAV 100 or, at least partially, in a remote computing environment (e.g., remote computing system 122).

The virtual machine 140 is quarantined from the rest of the UAV 100 so that a cyberattack that is detected can be segregated from the systems of the UAV in the virtual machine. The virtual machine 140 can respond to the same commands as the other systems of the UAV 100 and provide simulated telemetry 126 for transmission to a remote computing device (typically the unauthorized user 118). In some implementations, the logic of the virtual machine 140 is performed locally on resources of the computing system 130. In some implementations, the virtual machine 140 is outsourced to the cloud 122, and commands 120 from the unauthorized user 118 are redirected to the cloud 122 for processing. The purpose of the virtual machine 140 is for monitoring the behavior of the unauthorized user 118. This allows the security engine 138 to classify the unauthorized user 118 and possibly identify the unauthorized user. Additionally, the security engine 138 can better respond to future attacks by unauthorized users by gathering data about an occurring attack. Monitoring the behavior of unauthorized users is described below in relation to FIG. 2.

Figure 2:
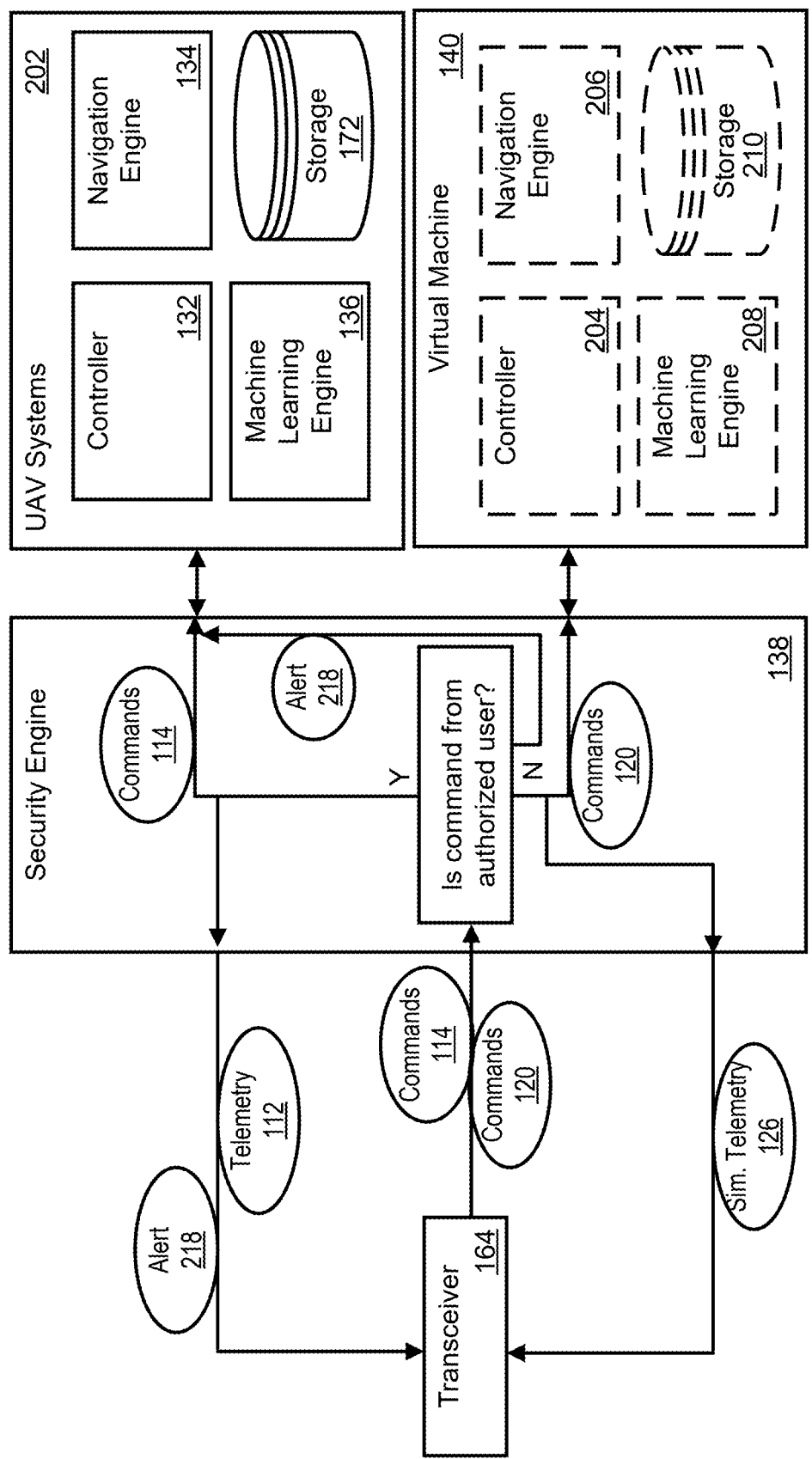
FIG. 2 shows a data flow for a security engine.

Turning to FIG. 2, a data flow graph shows how data are handled by the security engine 138 for detection of and response to a cyberattack on the UAV 100. The security engine 138 operates as an interface between remote computing systems and the other systems 202 of the UAV. The transceiver 164 sends authorized commands 114 or unauthorized commands 120 to the security engine 138 before the commands 114, 120 are sent to the remaining systems 202 of the UAV 100. The security engine 138 is configured to determine whether the commands being received are authorized or unauthorized. If the command is an authorized command 114, the security engine 138 passes the command 114 to the UAV systems 202. If the command is an unauthorized command 120, the security engine 138 either ignores the command 120 or passes the command to the virtual machine 140 for simulation of UAV 100 actions. If the command 114 is a legitimate command from an authorized user 116 (and/or the cloud 122), the security engine 138 sends actual telemetry 112 collected from the storage 172 and/or sensors 102, 174 of the UAV. If the command 120 is an attack from an unauthorized user 118, the security engine 138 ignores the command, sends simulated telemetry 126 in response to the command, and/or sends an alert 218 back to the authorized user 116 once secure communication with the authorized user is established or reestablished.

The security engine 138 receives a command from a remote computing system, and first determines whether the command is authorized or unauthorized. As stated above, the command can include a request for telemetry 112 from the UAV 100, instructions to update or otherwise change the flight plan of the UAV, instructions for the UAV to communicate with another remote computing system (including another UAV), an instruction to save data, delete data, or any other command for the UAV 100 to perform an action.

The security engine 138 includes a means for verifying the authenticity of the commands received from the remote computing system. Generally, the security engine 138 can check a security certificate of a transmission to determine whether the transmission is from an authorized user. However, other wireless communications security measures can be used including network layer security (Secure Sockets Layer, Transport Layer Security (TLS), etc.); firewalls such as packet filters; security tokens; encryption/decryption; etc.

The security engine 138 is configured to detect when a cyberattack is being attempted or has occurred. The security engine 138 is configured to analyze network traffic to determine whether a cyberattack is occurring. Furthermore, the security engine 138 analysis data from the UAV systems 202 to determine whether the UAV is operating suspiciously. For example, the security engine 138 determines whether a flight plan is being followed by the UAV 100. If the UAV 100 is operating in a state that is unexpected, it can be evidence that the flight plan is being ignored by the UAV. The UAV 100 might have missed a waypoint for navigation. The UAV 100 may be venturing away from a planned route (e.g., be a threshold distance away). A UAV 100 may be under attack if the UAV 100 is violating a geo-fence parameter (e.g., either pre-loaded in the storage 172 or received from a trusted source). The security engine 138 can determine that a system identifier is invalid, a security certificate of the transmission is invalid, a location of the system of the unauthorized user 118 appears suspicious, or any other such determination that signals that the unauthorized user is actually unauthorized.

In some implementations, the determination by the security engine 138 of whether a cyberattack is occurring can be user-specific and can be based, at least partially, on characteristics of previous missions executed by a particular authorized user 116. For example, certain sequences of commands, types of commands, frequency of commands, etc. may be typical for one authorized user 116, but atypical for another authorized user 116. Consequently, a detection of suspicious activity can be dependent on an identity of an authorized user 116 that claims to be operating the UAV. The security engine 138 can be configured to determine when the characteristics of a current mission deviate substantially from characteristics of previous missions conducted by the same authorized user 116. In this way, the security engine 138 can identify when an unauthorized user 118 is attempting to pose as a particular authorized user 116.

In some implementations, the security engine 138 determines that a cyberattack is occurring (and that commands 120 are not authorized) when there are repeated telemetry requests and/or requests for telemetry in a suspicious pattern (e.g., requests for camera data near an environmental feature that includes private property). For example, when a parameter that is nominally inaccessible (e.g., stored in tier N of data storage 172) is requested, the security engine 138 may determine that an unauthorized user 118 is attempting access. The security engine 138 may observe a pattern of requests for data/telemetry by the remote computing system and perform a security check to ensure that the requests are legitimate (e.g., request additional authentication, transmit an alert on a secure channel, etc.).

The security engine 138 can monitor operational parameter values of the sensors 102, 174 of the UAV and determine whether the parameters include suspicious values. For example, if one or more parameters (e.g., sensor data) deviate from standard values, the security engine 138 may determine that a cyberattack has occurred. In some implementations, the security engine 138 may determine that one or more sensors are being spoofed (e.g., GPS spoofing) if the data from a plurality of sensors are illogical. For example, if accelerometer data indicate that the UAV should be turning in a first direction, but GPS data indicate that the UAV is heading in a second direction, the security engine 138 may determine that the GPS data are being spoofed by an attacker. The security engine 138 can thus test the sensors 102, 174 to determine whether their data is being spoofed by the unauthorized user 118.

The security engine 138 is configured to detect a variety of cyberattacks. For example, the security engine 138 detects man-in-the-middle attacks, such as remote address changes, session hijacking, IP (Internet Protocol) spoofing, replay attacks, and so forth. The security engine 138 is configured to detect eavesdropping attacks. The security engine 138 is configured to detect distributed denial of service (DDOS) or other jamming attacks. The security engine 138 is configured to detect malware injections.

The security engine 138 responds to the detected attack in several ways. The security engine 138 ignores commands from a compromised remote computing system (e.g., the unauthorized user 118). The security engine 138 can quarantine sensitive data in storage 172 as described above, and restrict UAV systems 202 from accessing the data until the attack is dealt with. The security engine 138 can attempt to establish a secure connection with an authorized user 116 using an emergency channel and send an alert 218 to the authorized user 116 that the UAV 100 has been attacked by an unauthorized user 118. The security engine 138 inputs the unauthorized commands 120 into a virtual machine 140 that simulates the systems of the UAV. Here, the virtual machine 140 includes a simulated controller 204, simulated navigation engine 206, simulated machine learning engine 208, and simulated storage 210, corresponding to the controller 130, navigation engine 134, machine learning engine 136, and storage 172, respectively.

The virtual machine 140 allows the unauthorized user 118 to send commands 120 and receive simulated telemetry 126. This allows the security engine 138 to monitor the behavior of the unauthorized user 118 in a controlled environment, without interrupting operation of the UAV 100. For example, the security engine 138 can monitor where the unauthorized user 118 commands the UAV 100 to fly, what telemetry the unauthorized user commands be returned, etc.

The virtual machine 140 can be configured to respond to commands of the unauthorized user 118 and provide simulated results to further convince the unauthorized user that the UAV 100 has been compromised. For example, if the unauthorized user 118 commands the UAV 100 to approach a new waypoint that is not in the mission plan, the virtual machine will simulate such action by the UAV. The virtual machine 140 can then track, for example, a target location of the UAV 100 intended by the unauthorized user 118 (e.g., target GPS coordinates sent to the UAV as a destination by the unauthorized user). The log of commands received by the UAV 100 from the unauthorized user 118 can be stored for later use. For example, the commands from the unauthorized user can be provided to the authorized user 116, such as to assist the authorized user in determining who the unauthorized user 118 is, monitor the intentions of the unauthorized user 118, and so forth. The virtual machine 140 provides as realistic simulated data to the unauthorized user as possible to encourage the unauthorized user to continue sending commands to the UAV 100 for as long as possible, so that the log of unauthorized commands is more detailed (e.g., relative to cutting access to the unauthorized user immediately).

While monitoring the behavior of the unauthorized user 118 in the virtual machine 140, the security engine 138 can classify the attack for future use in detection of the attack. For example, if the unauthorized user 118 sends data from a particular address, series of addresses, at particular times, etc. the security engine 138 can classify the behavior as indicative of an unauthorized user 118. The security engine 138 records the series of commands 120 from the unauthorized user 118 in a log that can be input into a machine-learning engine or otherwise be accessible at another time.

The security engine 138 sends an alert 218 to the authorized user 116 once the unauthorized user 118 has been identified. An alert can be sent to the authorized user 116 so as not to provide information to the unauthorized user 118 that the attack has been detected by the UAV 100. For example, the security engine 138 may open a second communications channel and send the alert 218 to the authorized user 116 separate from the nominal communication channel. The alert 218 can include a notification that the UAV 100 has been attacked. In some implementations, the alert 218 may include a request for further identity verification that must be received before further commands 114 are recognized from a remote computing system. For example, if an eavesdropping attack is occurring, a predetermined code word can be sent to the authorized user 116 that the authorized user recognizes as indicative of an attack.

While the virtual machine 140 runs the simulation, the UAV 100 continues to operate according to the flight plan known to be legitimate (e.g., a pre-loaded flight plan). Once contact is resumed with the authorized user 116, the UAV 100 may resume accepting updates to the flight plan from the authorized user 116. In some implementations, the virtual machine is isolated from the navigation engine 134 to ensure that the unauthorized user 114 cannot hijack the UAV 100 or otherwise escape the virtual machine 140 during the simulation.

Figure 3A:
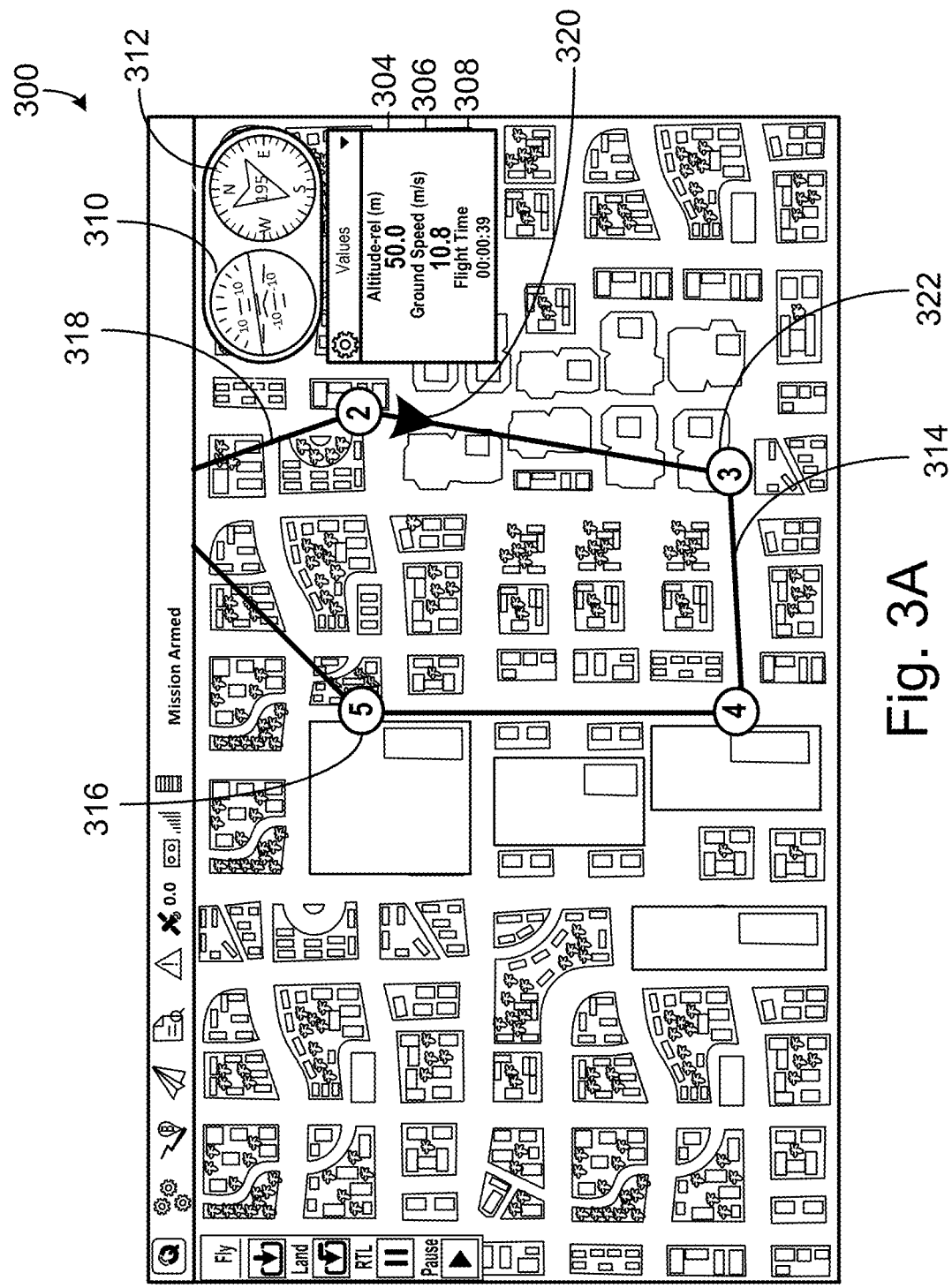
FIGS. 3A-3C show an example user interface.
Figure 3B:
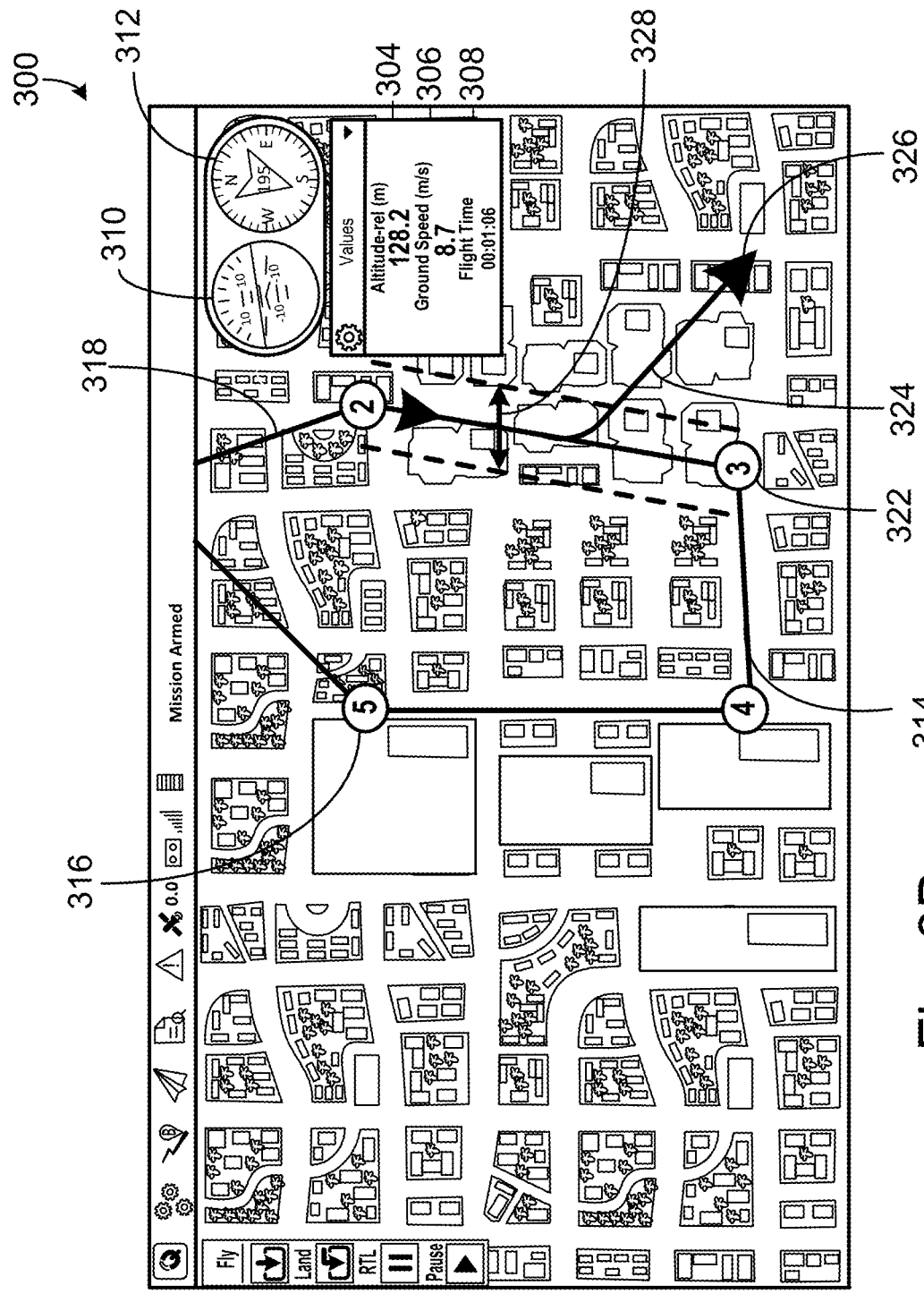
Figure 3C:
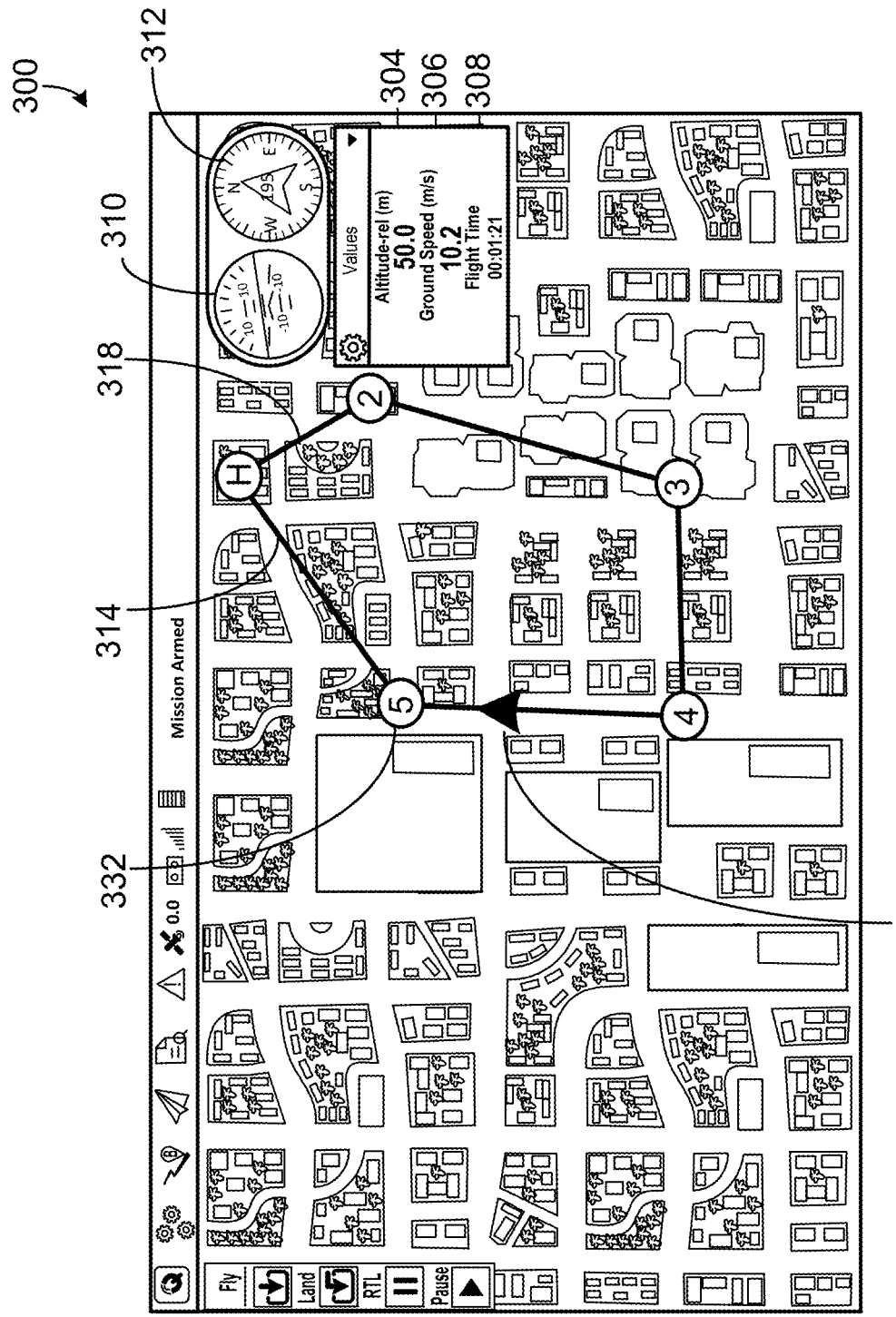

FIGS. 3A-3C show an example of detection and response to an attack. FIGS. 3A-3C show examples of a user interface 300 detailing a flight plan of the UAV 100. The user interface 300 can be what the authorized user 116 can see during UAV operations. The user interface 300 includes display of telemetry (e.g., telemetry 112 of FIG. 1A). The user interface includes a pose indicator 310 that shows a graphical representation of the pitch, roll, and (local) yaw of the UAV 100. The user interface 300 shows a heading representation 312 showing the global direction that the UAV 100 is pointed. Other telemetry can be displayed, on the user interface 300. For example, an altitude meter 304, a ground speed meter 306, and a flight time clock 308 are shown. Other parameters can be selectively transmitted to the authorized user 116 for display in the user interface 300. For example, the user interface 300 can show camera images, GPS coordinates, and other parameter values. In some implementations, the user interface can be configured to show all or a portion of the status data 178. The accessibility of the status data 178 and the navigation data 176 can depend on a security level of the data and how the data are stored in the storage 172, as described above with respect to FIG. 1B.

The user interface 300 shows a flight plan of the UAV 100. The flight plan shows a path 318 taken by the UAV 100 between various waypoints (e.g., GPS waypoints). The flight plan shows a position 320 of the UAV 100 in the local and/or global environment. The position 320 is shown in the form an arrow, in which the heading of the UAV 100 corresponds to the direction of the arrow. The next waypoint 322 is highlighted on the flight plan. Other waypoints are shown, such as waypoint 316. The planned path 314 connects the waypoints into a planned path through an environment. According to FIG. 3A, the UAV 100 is still operating in accordance with the flight plan, as the position 320 of the UAV 100 is on the planned path between the waypoints.

FIG. 3B shows user interface 300 at a later point in time than FIG. 3A. In FIG. 3B, the UAV 100 has gone off course, shown by arrow 326. The heading and position of the UAV 100 are not in accordance with the flight plan. The UAV 100 has gone away from the planned route 314 and instead on route 324. The security engine 138 can detect that the UAV 100 is operating abnormally. For example, the security engine 138 detects that a geo-fence has been violated. UAV 100 has deviated from the planned route by a width greater than the geo-fence 328 tolerates. The security engine 138 may cause the UAV 100 to ignore commands that caused it to fly away from the planned path and instead cause the UAV 100 to return to the flight plan. An alert (e.g., alert 218) can be sent back to the authorized user 116 requesting whether suspicious commands that have been identified as causing deviation from the flight plan were sent from the authorized user 116. The authorized user 116 may be requested to provide additional authentication before control is restored to the authorized user 116 (e.g., to prove that they are not in fact an unauthorized user 118). The response from the user can be monitored, and if the security check fails, stored in the storage of the UAV 100 for later analysis, and control is not handed to the user. If the security check succeeds, control is restored to the user and new commands are recognized by the computing system 130.

FIG. 3C shows the user interface 300 at a later time than FIG. 3B. The UAV 100 is back on the planned flight path, shown by arrow 330. The next waypoint 332 is now waypoint 5. It is possible that the authorized user 116 has retaken control of the UAV 100 and returned it to the original flight plan. It is also possible that the unauthorized user 118 is still attempting to control the UAV 100, but that the unauthorized user 118 has been confined to the virtual machine 140. In that case, the UAV 100 automatically returns to the intended flight plan without intervention from the authorized user 116.

Figure 4:
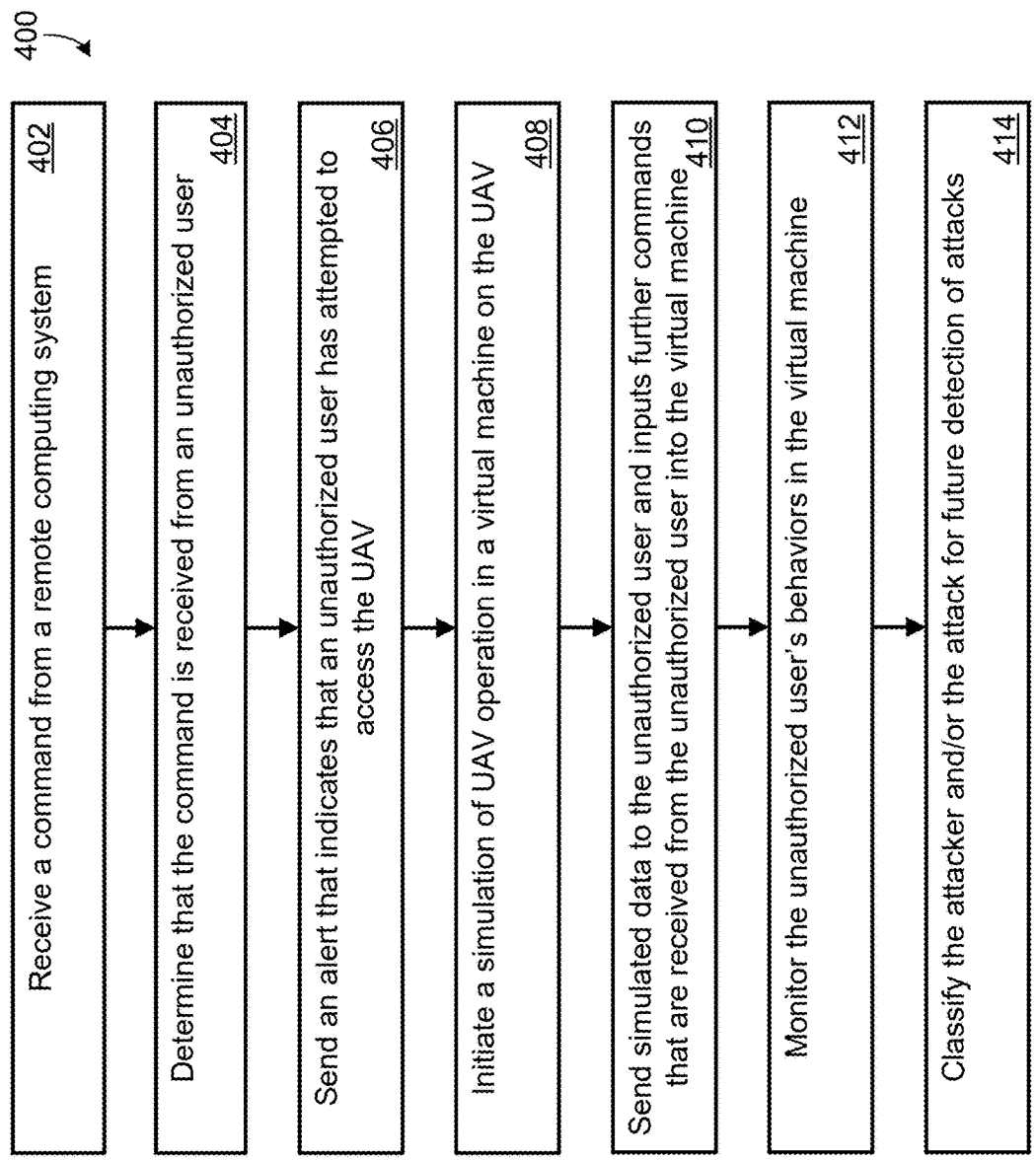
FIG. 4 shows an example process for detecting and responding to a cyberattack.

FIG. 4 shows an example process 400 for detecting and responding to a cyberattack. The process 400 can be performed by the UAV of FIGS. 1A-1B. The UAV (e.g., UAV 100 of FIG. 1A-1B) receives (402) a command from a remote computing system. The UAV determines (404) that the command is received from an unauthorized user (e.g., unauthorized user 118 of FIGS. 1A-1B). The UAV sends (406) an alert that indicates that an unauthorized user has attempted to access the UAV. The alert is sent to an authorized user. The UAV initiates (408) a simulation of UAV operation in a virtual machine on the UAV. The UAV sends (410) simulated data to the unauthorized user and inputs further commands that are received from the unauthorized user into the virtual machine to continue the simulation. The UAV monitors (412) the unauthorized user's behaviors in the virtual machine. The UAV uses data gathered during the monitoring to classify (414) the attacker and/or the attack for future detection of attacks.

Figure 5:
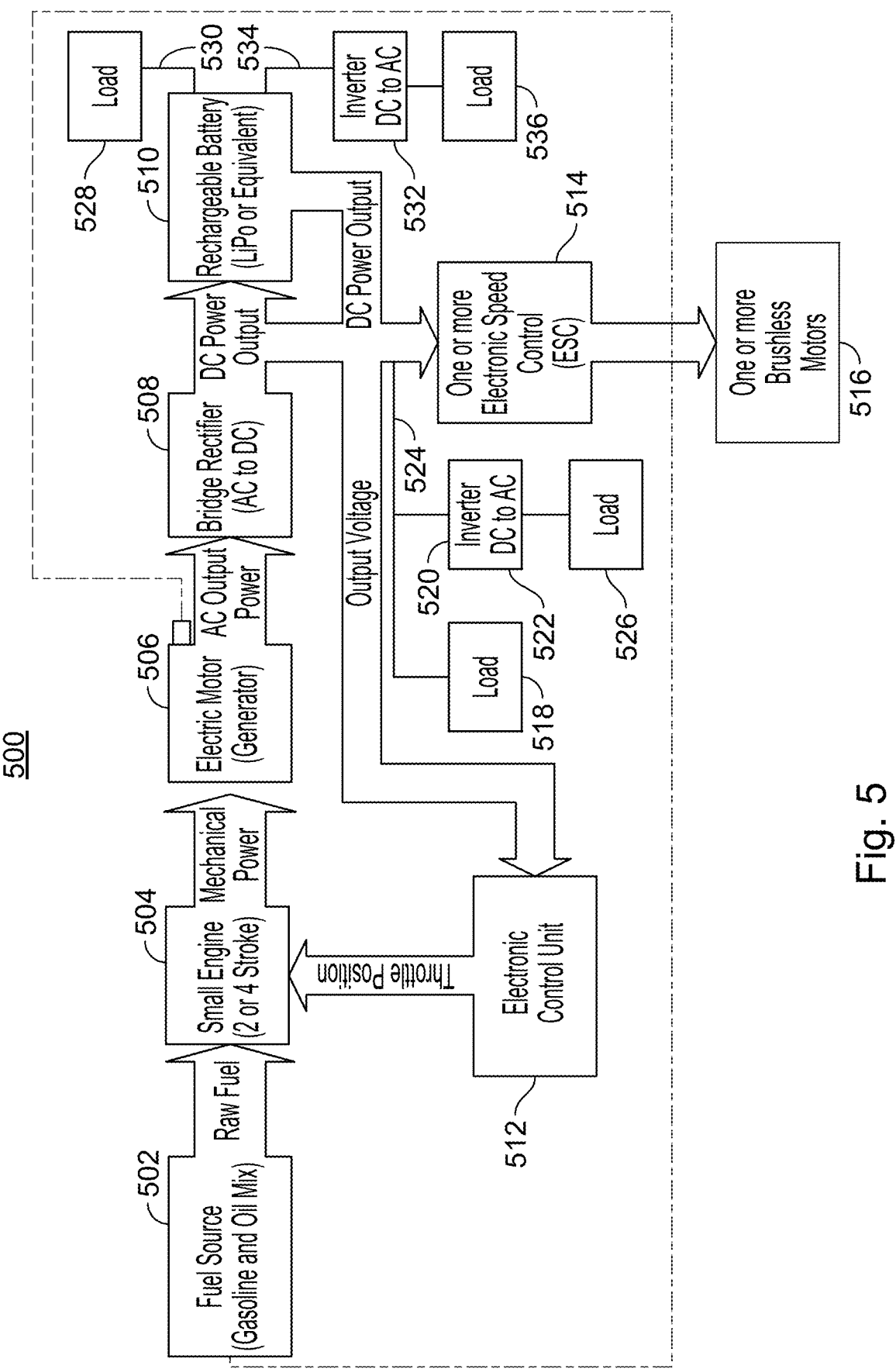
FIG. 5 shows a diagram of an example hybrid generator system.

FIG. 5 shows a diagram of an example hybrid generator system 500. The hybrid generator system 500 includes a fuel source 502 (e.g., a vessel) for storing gasoline, a mixture of gasoline and oil mixture, or similar type fuel or mixture. The fuel source 502 provides fuel to an engine 504 of a first power system. The engine 504 can use the fuel provided by the fuel source 502 to generate mechanical energy. In some examples, the engine 504 can have dimensions of about 12" by 11" by 6" and a weight of about 3.5 lbs. to allow for integration in a UAV. In some examples, the engine 504 may be an HWC/Zenoah G29 RCE 3D Extreme available from Zenoah, 1-9 Minamidai Kawagoe, Saitama 350-2025, Japan. The hybrid generator system 500 also includes a generator motor 506 coupled to the engine 504. The generator motor 506 functions to generate AC output power using mechanical power generated by the engine 504. In some examples, a shaft of the engine 504 includes a fan that dissipates heat away from the engine 504. In some examples, the generator motor 506 is coupled to the engine 504 through a polyurethane coupling.

In some examples, the hybrid generator system 500 can provide 1.8 kW of power. The hybrid generator system 500 can include an engine 504 that provides approximately 3 horsepower and weighs approximately 1.5 kg. In some examples, the engine 504 may be a Zenoah® G29RC Extreme engine. The hybrid generator system 500 can include a generator motor 506 that is a brushless motor, such as a 380 Kv, 8 mm shaft, part number 5035-380, available from Scorpion Precision Industry®.

In some examples, the hybrid generator system 500 can provide 10 kW of power. The hybrid generator system 500 can include an engine 504 that provides approximately between 15-16.5 horsepower and weighs approximately 7 pounds. In some examples, the engine 504 is a Desert Aircraft® D-150. The hybrid generator system 500 can include a generator motor 506, such as a Joby Motors® JM1 motor.

The hybrid generator system 500 includes a bridge rectifier 508 and a rechargeable battery 510. The bridge rectifier 508 is coupled between the generator motor 506 and the rechargeable battery 510 and converts the AC output of the generator motor 506 to DC power to charge the rechargeable battery 510 or provide DC power to load 518 by line 520 or power to DC-to-AC inverter 522 by line 524 to provide AC power to load 526. The rechargeable battery 510 may provide DC power to load 528 by line 530 or to DC-to-AC inverter 532 by line 534 to provide AC power to load 536. In some examples, an output of the bridge rectifier 508 and/or the rechargeable battery 510 of hybrid generator system 500 is provided by line 538 to one or more electronic speed control devices (ESC) 514 integrated in one or more rotor motors 516 as part of a UAV. The ESC 514 can control the DC power provided by bridge rectifier 508 and/or rechargeable battery 510 to one or more rotor motors provided by generator motor 506. In some examples, the ESC 514 can be a T-Motor® ESC 45A (2-6S) with SimonK. In some examples, the bridge rectifier 508 can be a model #MSD100-08, diode bridge 800V 100A SM3, available from Microsemi Power Products Group®. In some examples, active rectification can be applied to improve efficiency of the hybrid generator system.

In some examples, the ESC 514 can control an amount of power provided to one or more rotor motors 516 in response to input received from an operator. For example, if an operator provides input to move a UAV to the right, then the ESC 514 can provide less power to rotor motors 516 on the right of the UAV to cause the rotor motors to spin propellers on the right side of the UAV slower than propellers on the left side of the UAV. As power is provided at varying levels to one or more rotor motors 516, a load (e.g., an amount of power provided to the one or more rotor motors 516) can change in response to input received from an operator.

In some examples, the rechargeable battery 510 may be a LiPo battery, providing 3000 mAh, 22.2V 65C, Model PLU65-30006, available from Pulse Ultra Lipo®, China. In some examples, the rechargeable battery 510 may be a lithium sulfur (LiSu) rechargeable battery or similar type of rechargeable battery.

The hybrid generator system 500 includes an electronic control unit (ECU) 512. The ECU 512, and other applicable systems described herein, can be implemented as a computer system, a plurality of computer systems, or parts of a computer system or a plurality of computer systems. The computer system may include a processor, memory, non-volatile storage, and an interface. A typical computer system will usually include at least a processor, memory, and a device (e.g., a bus) coupling the memory to the processor. In some examples, the processor may be a general-purpose central processing unit (CPU), such as a microprocessor, or a special-purpose processor, such as a microcontroller.

In some examples, the memory can include random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data may be written, by a direct memory access process, into memory during execution of software on the computer system. The non-volatile storage can be local, remote, or distributed. The non-volatile storage may be optional because systems can be created with all applicable data available in memory.

Software is typically stored in the non-volatile storage. In some examples (e.g., for large programs), it may not be practical to store the entire program in the memory. Nevertheless, it should be understood that the software may be moved to a computer-readable location appropriate for processing, and for illustrative purposes, that location is referred to as the memory herein. Even when software is moved to the memory for execution, the processor will typically make use of hardware registers to store values associated with the software, and local cache that, in some examples, serves to speed up execution. As used herein, a software program may be stored at an applicable known or convenient location (e.g., from non-volatile storage to hardware registers) when the software program is referred to as "implemented in a computer-readable storage medium." A processor is considered to be "configured to execute a program" when at least one value associated with the program is stored in a register readable by the processor.

In some examples of operation, a computer system can be controlled by operating system software, such as a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. In some examples, the I/O devices can include a keyboard, a mouse or other pointing device, disk drives, printers, a scanner, and other I/O devices, including a display device. In some examples, the display device can include a cathode ray tube (CRT), liquid crystal display (LCD), or some other applicable known or convenient display device. The interface can include one or more of a modem or network interface. It will be appreciated that a modem or network interface can be considered to be part of the computer system. The interface can include one or more of an analog modem, ISDN modem, cable modem, token ring interface, Ethernet interface, satellite transmission interface (e.g. "direct PC"), or other interfaces for coupling a computer system to other computer systems. Interfaces enable computer systems and other devices to be coupled together in a network.

A computer system can be implemented as a module, as part of a module, or through multiple modules. As used herein, a module can include one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the module's functionality, or the like. As such, a first module and a second module can have one or more dedicated processors, or a first module and a second module can share one or more processors with one another or other modules. Depending upon implementation-specific or other considerations, in some examples, a module can be centralized or its functionality distributed. A module can include hardware, firmware, or software embodied in a computer-readable medium for execution by the processor. The processor can transform data into new data using implemented data structures and methods, such as is described with reference to the figures included herein.

The ECU 512 is coupled to the bridge rectifier 508 and the rechargeable battery 510. The ECU 512 can be configured to measure the AC voltage of the output of the generator motor 506, which is directly proportional to the revolutions per minute (RPM) of the engine 504, and compares it to the DC power output of the bridge rectifier 508. The ECU 512 can control the throttle of the engine 504 to cause the DC power output of the bridge rectifier 508 to increase or decrease as the load changes (e.g., a load of one or more electric motors 516 or one or more of loads 518, 526, 528, and 536). In some examples, the ECU 512 can be an Arduino® MEGA 2560 Board R3, of Turin Italy. In various embodiments, a load of one or more electric motors 516 can change as the ESC 514 changes an amount of power provided to the electric motors 516. For example, if a user inputs to increase the power provided to the electric motors 516 subsequently causing the ESC 514 to provide more power to the electric motors 516, then the ECU 512 can increase the throttle of the engine 504 to cause the production of more power to be provided to the electronic motors 516.

The ECU 512 can function to maintain voltage output of loads by reading the sensed analog voltage, converting the sensed analog voltage to ADC counts, comparing the count to that corresponding to a desired voltage, and increasing or decreasing the throttle of the engine 504 according to the programmed gain if the result is outside of the dead band.

In some examples, the hybrid generator system 500 can provide about 1,800 watts of continuous power, 10,000 watts of instantaneous power (e.g., 6S with 16,000 mAh pulse battery) and has a 1,500 Wh/kg gasoline conversion rate. In some examples, the hybrid generator system 500 has dimensions of about 12" by 12" by 12" and a weight of about 8 lbs.

Figure 6:
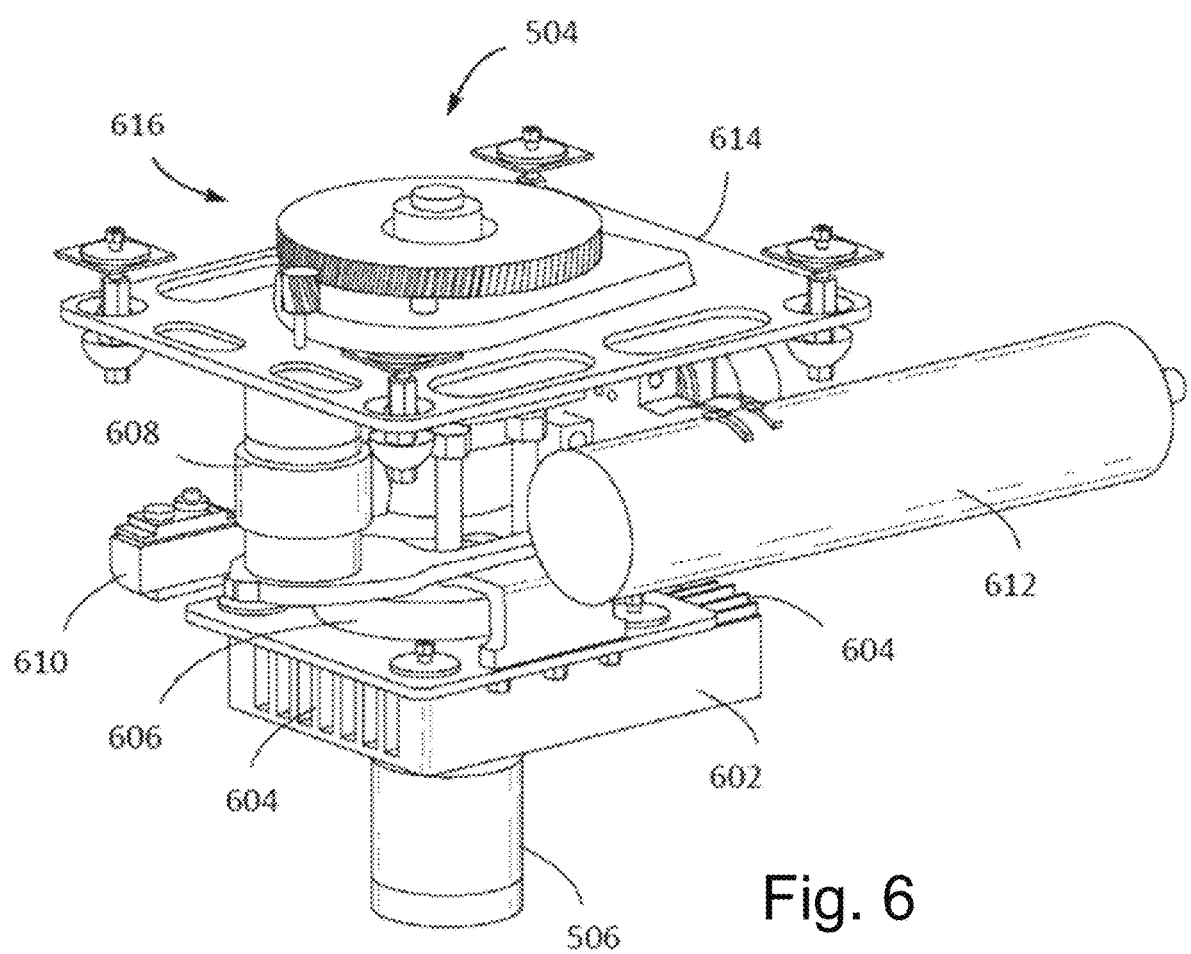
FIG. 6 shows a side perspective view of a hybrid generator system.
Figure 7B:
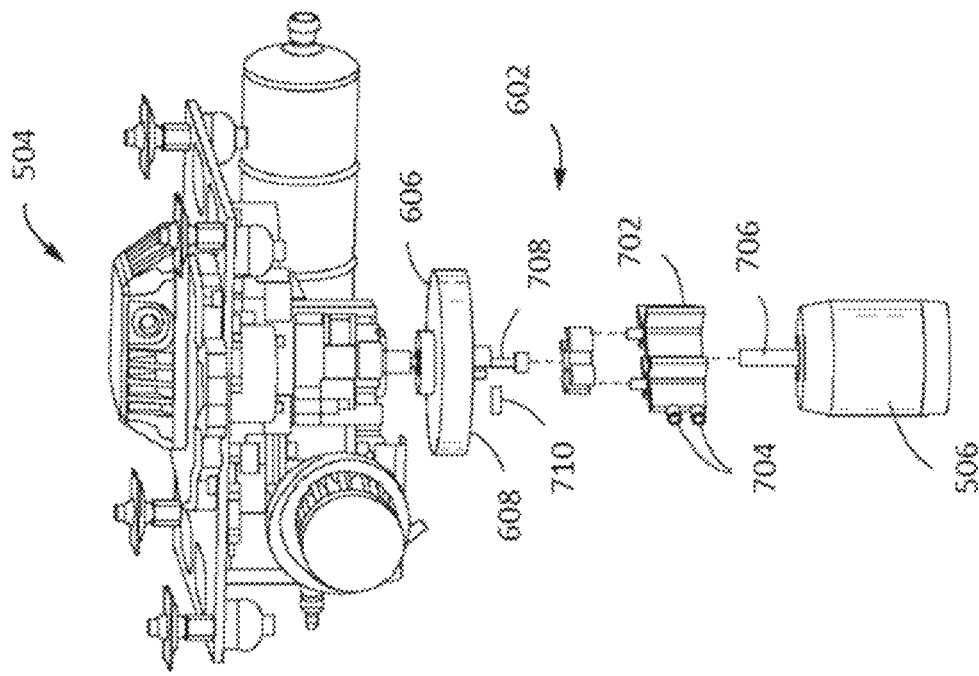
FIG. 7B shows an exploded side view of a hybrid generator.
Figure 7A:
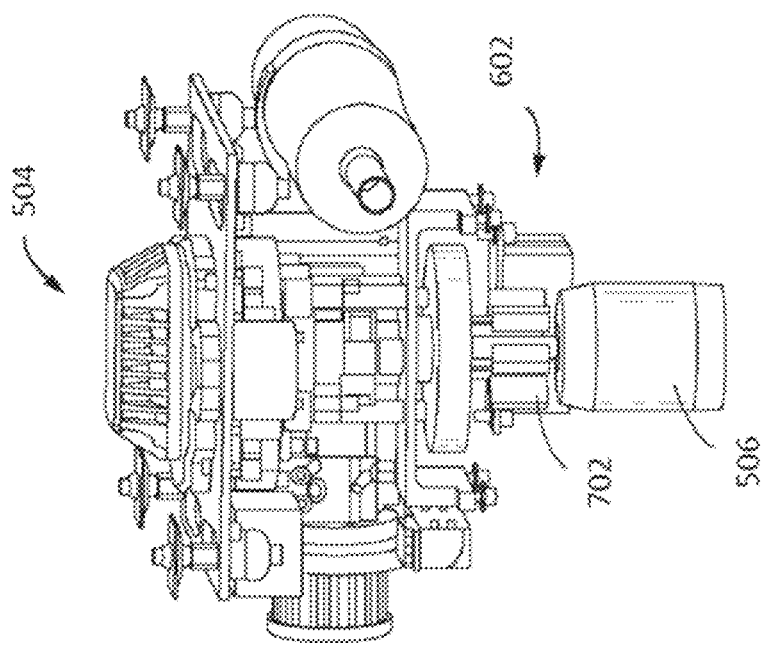
FIG. 7A shows a side view of a hybrid generator.

FIG. 6 shows a side perspective view of a hybrid generator system 500. FIG. 7A shows a side view of a hybrid generator 500. FIG. 7B shows an exploded side view of a hybrid generator 500. The hybrid generator system 500 includes an engine 504 coupled to generator motor 506. In one embodiment, the engine 504 includes a coupling/cooling device 602 that provides coupling of the shaft of the generator motor 506 to the shaft of the engine 504 and provides cooling with sink fins 604. For example, FIGS. 7A and 7B show in further detail one embodiment of coupling/cooling device 602, which includes coupling/fan 702 with set screws 704 that couple shaft 706 of generator motor 506 and shaft 708 of the engine 504. Coupling/cooling device 602 may also include rubber coupling ring (2202 of FIG. 22A).

In some examples, the hybrid generator system 500 includes components to facilitate transfer of heat away from the hybrid generator system 500 and/or is integrated within a UAV to increase airflow over components that produce heat. For example, the hybrid generator system 500 can include cooling fins on specific components (e.g. the rectifier) to transfer heat away from the hybrid generator system. In some examples, the hybrid generator system 500 includes components and is integrated within a UAV to cause heat to be transferred towards the exterior of the UAV. In some implementations, the heat dissipation system of the UAV can be interfaced with the computing hardware, such as of navigation system 110, to remove heat during operation. Since the navigation system 110 can draw up to 1800 W of power, the head dissipation system reduces the risk of damage to the computing hardware.

In some examples, the hybrid generator system 500 and/or a UAV integrating the hybrid generator system 500 is configured to allow 406 cubic feet per minute of airflow across at least one component of the hybrid generator system 500. An engine 504 of the hybrid generator system 500 can be run at an operating temperature 150° C. and if an ambient temperature in which the hybrid generator system 500, in order to remove heat generated by the engine 506, an airflow of 406 cubic feet per minute is achieved across at least the engine 506. Further, in some examples, the engine 506 is operated at 16.5 Horsepower and generates 49.2 kW of waste heat (e.g. each head of the engine produces 24.6 kW of waste heat). In some examples, engine heads of the engine 506 of the hybrid generator system 500 are coupled to electric ducted fans to concentrate airflow over the engine heads. For example, 406 cubic feet per minute airflow can be achieved over engine heads of the engine 506 using electric ducted fans.

In some examples, the hybrid generator system 500 is integrated as part of a UAV using a dual vibration damping system. An engine 506 of the hybrid generator system can utilize couplings to serve as dual vibration damping systems. In some examples, the engine 506 produces a mean torque of 1.68 Nm at 10,000 RPM. In some examples, a urethane coupling is used to couple at least part of the hybrid generator system 500 to a UAV. Further, in some examples, the urethane coupling can have a durometer value between 90A to 75D. Example urethane couplings used to secure at least part of the hybrid generator system 500 to a UAV include L42 Urethane, L100 Urethane, L167 Urethane, and L315 Urethane. Urethane couplings used to secure at least part of the hybrid generator system 500 to a UAV can have a tensile strength between 20 MPa and 62.0 MPa, between 270 to 800% elongation at breaking, a modulus between 2.8 MPa and 32 MPa, an abrasion index between 110% and 435%, and a tear strength split between 12.2 kN/m and 192.2 kN/m.

The engine 504 also includes a fly wheel 606 which can reduce mechanical noise and/or engine vibration. In some examples, engine 504 includes a Hall-Effect sensor (710 of FIG. 7A) and a Hall Effect magnet coupled to fly wheel 606, as shown. In some examples, the Hall-effect sensor 710 may be available from RCexl Min Tachometer®, Zhejiang Province, China.

When the engine 504 is operational, fly wheel 606 spins and generates a voltage which is directly proportional to the revolutions per minute of fly wheel 606. This voltage is measured by Hall-effect sensor 710 and is input into an ECU 512. The ECU 512 compares the measured voltage to the voltage output by generator motor 506. ECU 512 will then control the throttle of either or both the generator motor 506 and the engine 504 to increase or decrease the voltage as needed to supply power to one or more of loads 518, 526, 528, and/or 536 or one or more rotor motors 516. The engine 504 may also include a starter motor 608, servo 610, muffler 612, and vibrational mount 614.

Figure 8:
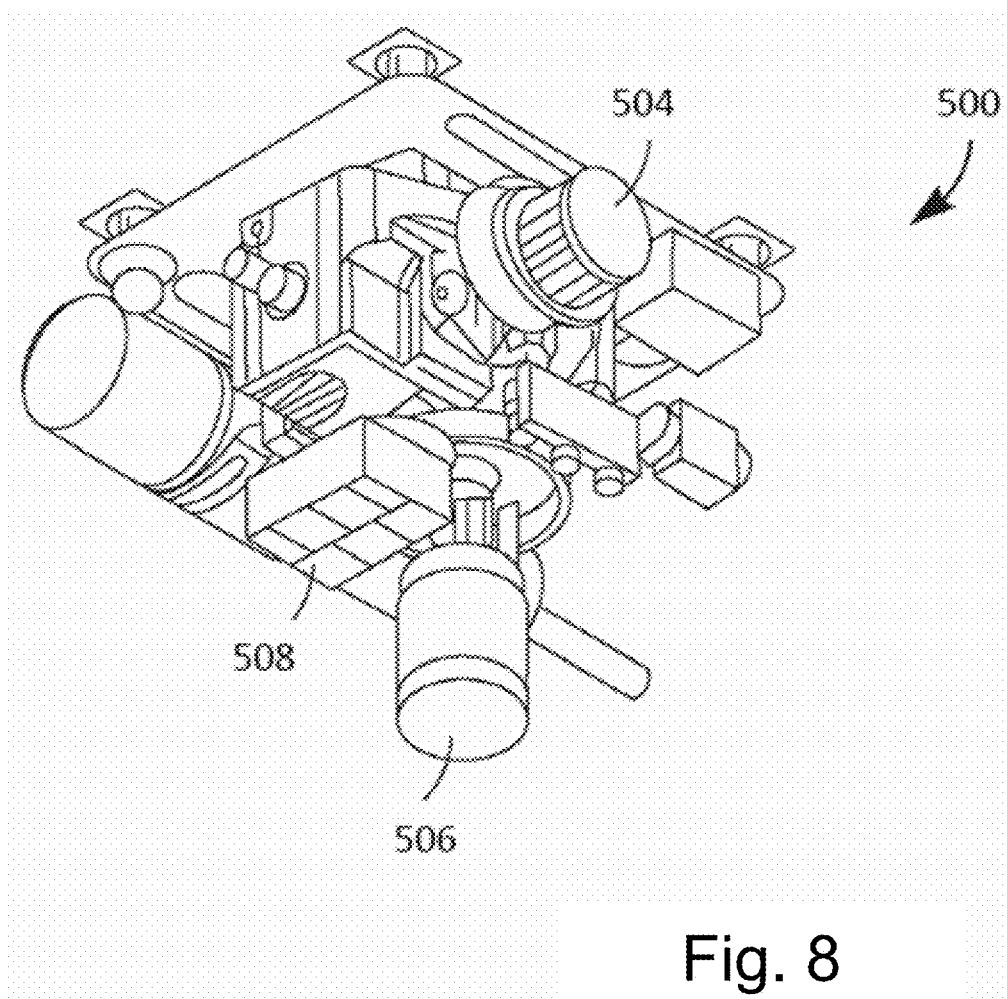
FIG. 8 shows a perspective view of a hybrid generator system.

FIG. 8 shows a perspective view of a hybrid generator system 500. The hybrid generator system 500 includes an engine 504 and generator motor 506 coupled to a bridge rectifier 508. The generator motor 506 includes a shaft oriented parallel to the axis of rotation of the at least one propeller and oriented vertically with respect to the ground when the UAV is airborne.

Figure 9:
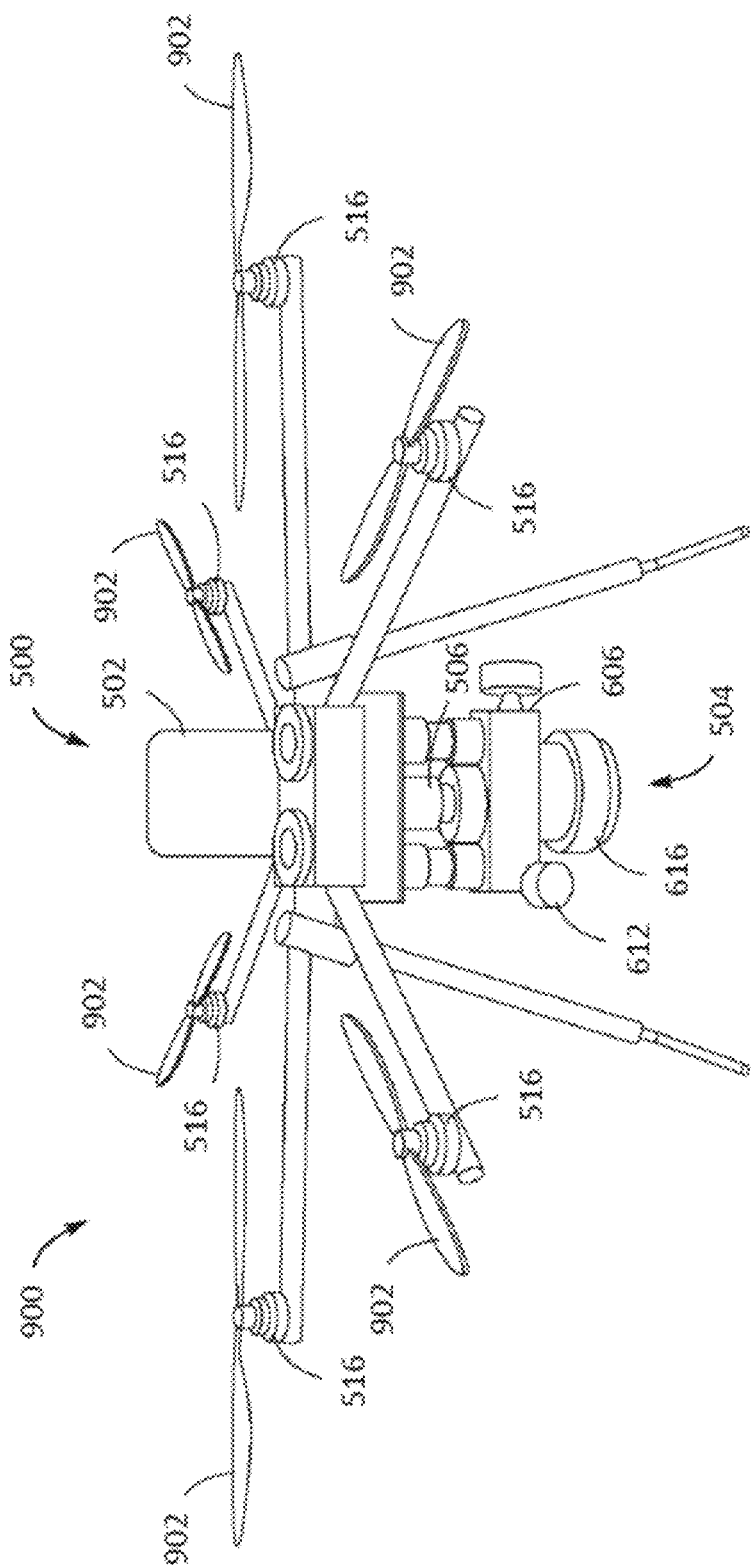
FIG. 9 shows a perspective view of a UAV integrated with a hybrid generator system.

FIG. 9 shows a perspective view of a UAV 900 integrated with a hybrid generator system 500. The UAV 900 includes six rotor motors 516 each coupled to propellers 902, however it is appreciated that a UAV integrated with a hybrid generator system 500 can include more or fewer rotor motors and propellers. The UAV 900 can include a Px4 flight controller manufactured by Pixhawk®.

In some examples, the engine 504 may be started using an electric starter (616 of FIGS. 6 and 9). Fuel source 502 can deliver fuel to engine 504 to spin its rotor shaft directly coupled to generator motor 506 (e.g., as shown in FIG. 7) and applies a force to generator motor 506. The spinning of generator motor 506 generates electricity and the power generated by motor generator 506 is proportional to the power applied by shaft of engine 504. In some examples, a target rotational speed of generator motor 506 is determined based on the KV (rpm/V) of generator motor 506. For example, if a target voltage of 25 Volt DC is desired, the rating of generator motor 506 may be about 400 KV. The rotational speed of the engine 504 may be determined by the following equations:

$$\text{RPM} = \text{KV (RPM/Volt)} \times \text{Target Voltage (VDC)} \quad (2)$$

$$\text{RPM} = 400 \text{ KV} \times 25 \text{ VDC} \quad (3)$$

$$\text{RPM} = 10{,}000 \quad (4)$$

In this example, for generator motor 506 to generate 25 VDC output, the shaft of generator motor 506 coupled to the shaft of engine 504 needs to spin at about 10,000 RPM.

As the load (e.g., one or more motors 516 or one or more of loads 518, 526, 528, and/or 536) is applied to the output of generator motor 506, the voltage output of the hybrid generator system 500 will drop, thereby causing the speed of engine 504 and generator motor 506 to be reduced. In some examples, ECU 512 can be used to help regulate the throttle of engine 504 to maintain a consistent output voltage that varies with loads. ECU 512 can act in a manner similar to that of a standard governor for gasoline engines, but instead of regulating an RPM, the ECU 512 can regulate a target voltage output of either or both a bridge rectifier and a generator motor 506 based on a closed loop feedback controller.

Power output from generator motor 506 can be in the form of alternating current (AC) which may need to be rectified by bridge rectifier 508. Bridge rectifier 508 can convert the AC power into direct current (DC) power, as discussed above. In some examples, the output power of the hybrid generator system 500 can be placed in a "serial hybrid" configuration, where the generator power output by generator motor 506 may be available to charge the rechargeable battery 510 or provide power to another external load.

In operation, there can be at least two available power sources when the hybrid generator system 500 is functioning. A primary source can be from the generator motor 506 through directly from the bridge rectifier and a secondary power source can be from the rechargeable battery 510. Therefore, a combination of continuous power availability and high peak power availability is provided, which may be especially well-suited for UAV applications or portable generator applications. In cases where either primary power source (e.g., generator motor 506) is not available, system 500 can still continue to operate for a short period of time using power from rechargeable battery 510, thereby allowing a UAV to sustain safety strategy, such as an emergency landing.

When hybrid generator system 500 is used for UAVs, the following conditions can be met to operate the UAV effectively and efficiently: 1) the total continuous power (watts) can be greater than power required to sustain UAV flight, 2) the power required to sustain a UAV flight is a function of the total weight of the vehicle, the total weight of the hybrid engine, the total weight of fuel, and the total weight of the payload), where:

$$\text{Total Weight (gram)} = \text{vehicle dry weight} + \text{engine weight} + \text{fuel weight} + \text{payload} \quad (5)$$

and, 3) based on the vehicle configuration and aerodynamics, a particular vehicle will have an efficiency rating (grams/watt) of η, where:

$$\text{Total Power Required to Fly} = \eta \times \text{Weight (gram)} \quad (6)$$

In examples in which the power required to sustain flight is greater than the available continuous power, the available power or total energy may be based on the size and configuration of the rechargeable battery 510. A configuration of the rechargeable battery 510 can be based on a cell configuration of the rechargeable battery 510, a cell rating of the rechargeable battery 510, and/or total mAh of the rechargeable battery 510. In some examples, for a 6S, 16000 mAh, 25C battery pack, the total energy is determined by the following equations:

$$\text{Total Energy} = \text{Voltage} \times \text{mAh} = 25 \text{ VDC}(6S) \times 16000 \text{ mAh} = 400 \text{ Watt*Hours} \quad (7)$$

$$\text{Peak Power Availability} = \text{Voltage} \times \text{mAh} \times \text{C Rating} = \text{VDC} \times 16000 \text{ mAh} \times 25 \text{ C } 10,400 \text{ Watts} \quad (8)$$

$$\text{Total Peak Time} = 400 \text{ Watt*Hours}/10,400 \text{ Watts} = 138.4 \text{ secs} \quad (9)$$

Further, in some examples, the rechargeable battery 510 may be able to provide 10,400 Watts of power for 138.4 seconds in the event of primary power failure from engine 504. Additionally, the rechargeable battery 510 may be able to provide up to 10,400 Watts of available power for flight or payload needs instantaneous peak power for short periods of time needed for aggressive maneuvers.

The result is hybrid generator system 500, when coupled to a UAV, efficiently and effectively provides power to fly and maneuver the UAV for extended periods of time with higher payloads than conventional multi-rotor UAVs. In some examples, the hybrid generator system 500 can provide a loaded (e.g., 3 lb. load) flight time of up to about 2 hours 5 minutes, and an unloaded flight time of about 2 hours and 35 minutes. Moreover, in the event that the fuel source runs out or the engine 504 and/or he generator motor 506 malfunctions, the hybrid generator system 500 can use the rechargeable battery 510 to provide enough power to allow the UAV to perform a safe landing. In some examples, the rechargeable battery 510 can provide instantaneous peak power to a UAV for aggressive maneuvers, for avoiding objects, or threats, and the like.

In some examples, the hybrid generator system 500 can provide a reliable, efficient, lightweight, portable generator system which can be used in both commercial and residential applications to provide power at remote locations away from a power grid and for a micro-grid generator, or an ultra-micro-grid generator.

In some examples, the hybrid generator system 500 can be used for an applicable application (e.g., robotics, portable generators, micro-grids and ultra-micro-grids, and the like) where an efficient high energy density power source is desired and where a fuel source is readily available to convert hydrocarbon fuels into useable electric power. The hybrid generator system 500 has been shown to be significantly more energy efficient than various forms of rechargeable batteries (Lithium Ion, Lithium Polymer, Lithium Sulfur) and even Fuel Cell technologies typically used in conventional UAVs.

Figure 10:
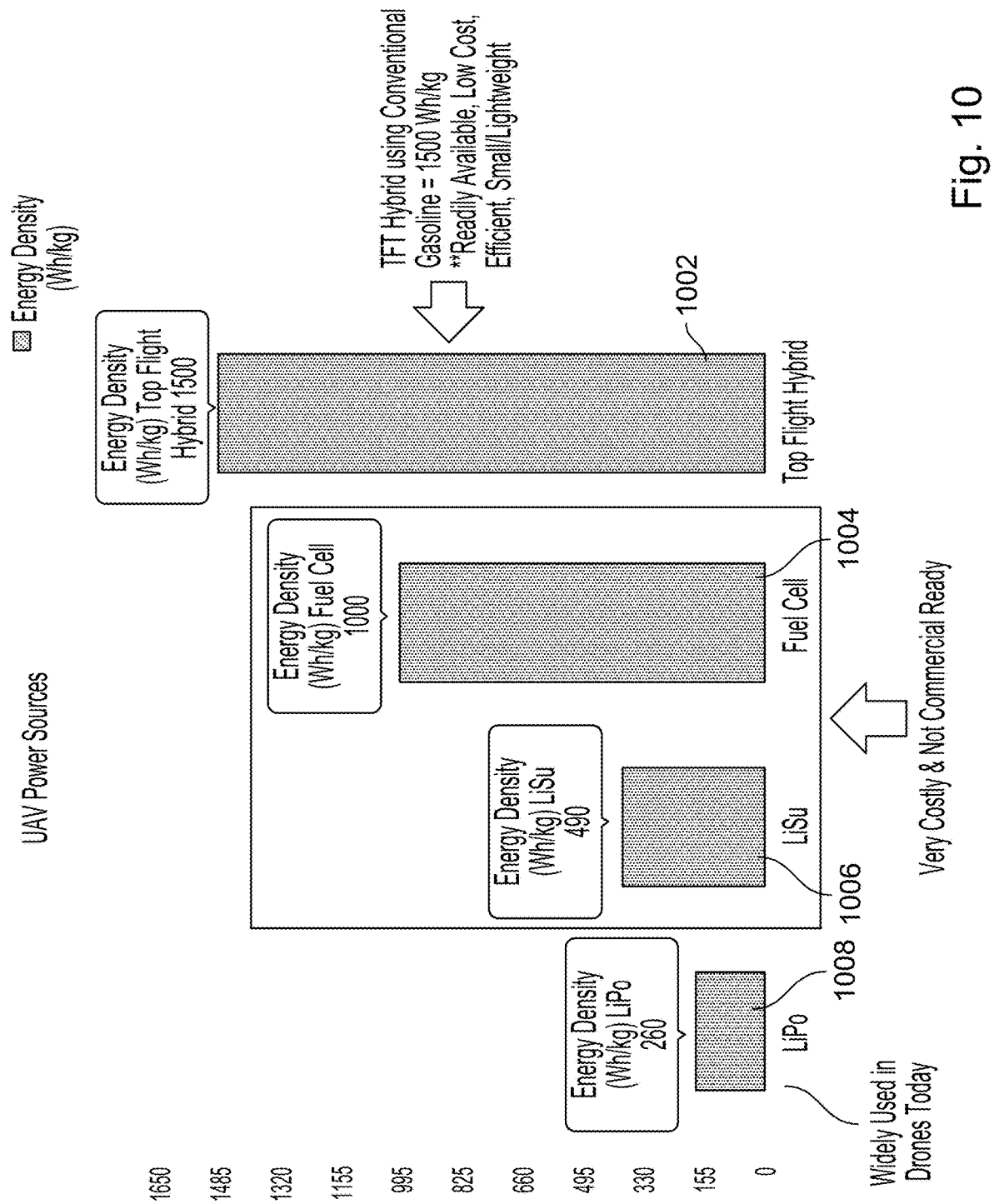
FIG. 10 shows a graph comparing energy density of different UAV power sources.

FIG. 10 shows a graph comparing energy density of different UAV power sources. In some examples, the hybrid generator system 500 can use conventional gasoline which is readily available at low cost and provide about 1,500 Wh/kg of power for UAV applications, as indicated at 1002 in FIG. 6. Conventional UAVs which rely entirely on batteries can provide a maximum energy density of about 1,000 Wh/kg when using an energy high density fuel cell technology, as indicated at 1004, about 400 Wh/kg when using lithium sulfur batteries, as indicated at 1006, and about 200 Wh/kg when using a LiPo battery, as indicated at 1008.

Figure 11:
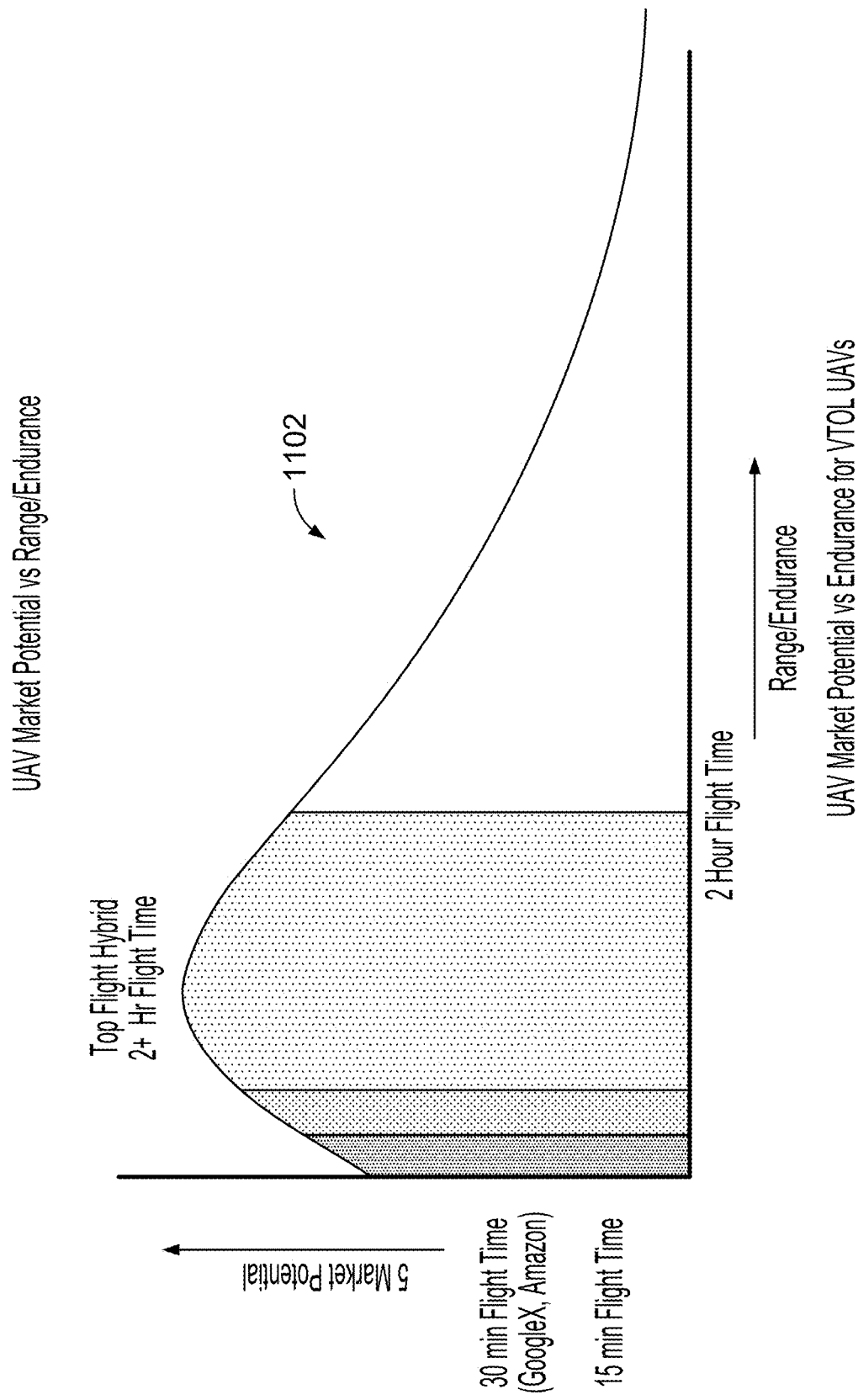
FIG. 11 shows a graph of market potential vs. endurance for an example UAV with an example hybrid generator system.

FIG. 11 shows a graph 1104 of market potential for UAVs against flight time for an example two plus hours of flight time hybrid generator system 500 when coupled to a UAV is able to achieve and an example of the total market potential vs. endurance for the hybrid generator system 500 for UAVs.

In some examples, the hybrid generator power systems 500 can be integrated as part of a UAV or similar type aerial robotic vehicle to perform as a portable flying generator using the primary source of power to sustain flight of the UAV and then act as a primary power source of power when the UAV has reached its destination and is not in flight. For example, when a UAV which incorporates the hybrid generator power system 500 (e.g., the UAV 900 of FIG. 9) is not in flight, the available power generated by micro hybrid system can be transferred to one or more of external loads 518, 526, 528, and/or 536 such that hybrid generator system 500 operates as a portable generator. Micro hybrid system generator 500 can provide continuous peak power generation capability to provide power at remote and often difficult to reach locations. In the "non-flight portable generator mode," micro hybrid system 500 can divert the available power generation capability towards external one or more of loads 518, 526, 528, and/or 536. Depending on the power requirements, one or more of DC-to-AC inverters 522, 532 may be used to convert DC voltage to standard AC power (120 VAC or 240 VAC).

In some examples, hybrid generator system 500 coupled to a UAV (e.g., UAV 900 of FIG. 9) will be able to traverse from location to location using aerial flight, land, and switch on the power generator to convert fuel into power.

Figure 12:
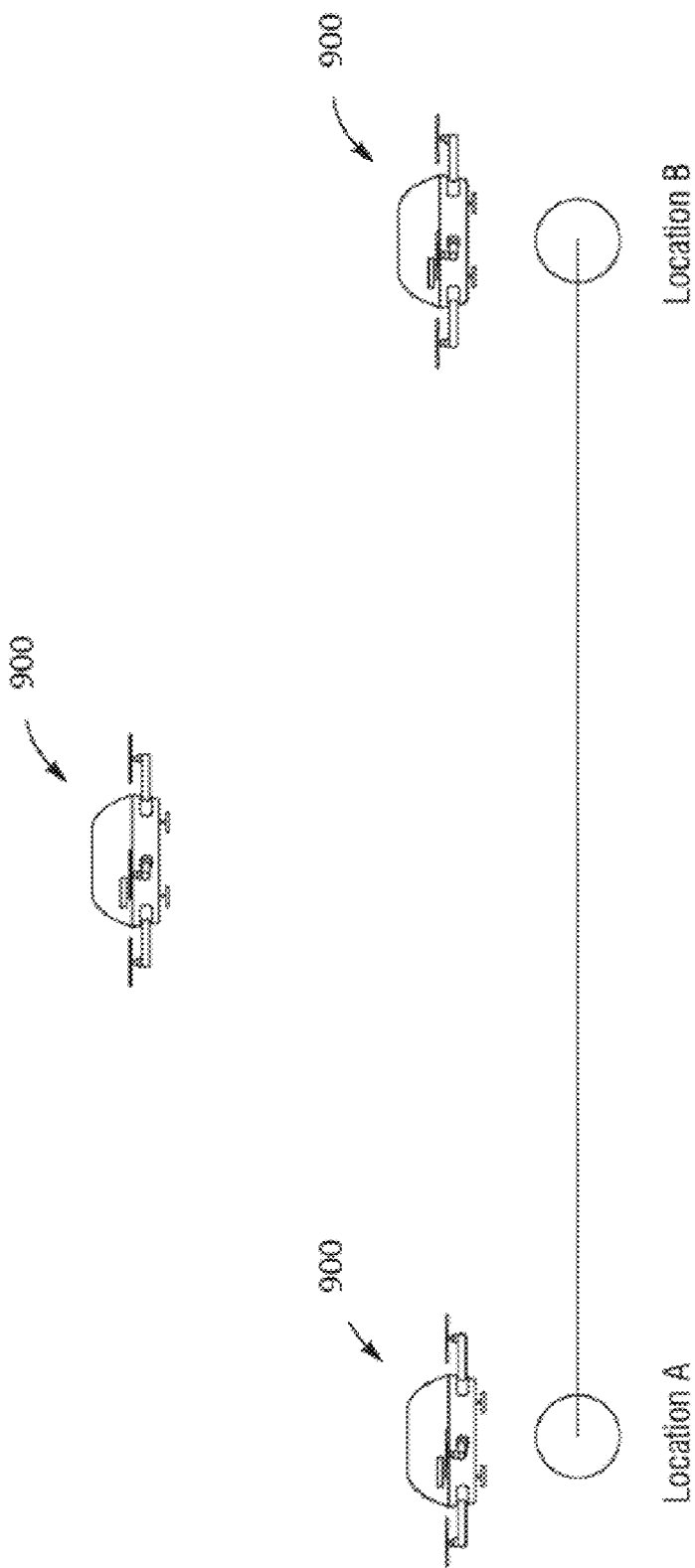
FIG. 12 shows an example flight pattern of a UAV with a hybrid generator system.

FIG. 12 shows an example flight pattern of a UAV (e.g., UAV 100 of FIG. 1) with a hybrid generator system 500. In the example flight pattern shown in FIG. 12, the UAV 900, with micro hybrid system 500 coupled thereto, begins at location A loaded with fuel ready to fly. The UAV 900 then travels from location A to location B and lands at location B. The UAV 900 then uses micro hybrid system 500 to generate power for local use at location B, thereby acting as a portable flying generator. For example, the UAV 900 can act as a charging station for the UAVs 120 of FIG. 1. When power is no longer needed, the UAV 900 returns back to location A and awaits instructions for the next task.

In some examples, the UAV 900 uses the power provided by hybrid generator system 500 to travel from an initial location to a remote location, fly, land, and then generate power at the remote location. Upon completion of the task, the UAV 900 is ready to accept commands for its new task. All of this can be performed manually or through an autonomous/automated process. In some examples, the UAV 900 with hybrid generator system 500 can be used in an applicable application where carrying fuel and a local power generator are needed. Thus, the UAV 900 with a hybrid generator system 500 eliminates the need to carry both fuel and a generator to a remote location. The UAV 900 with a hybrid generator system 500 is capable of powering both the vehicle when in flight, and when not in flight can provide the same amount of available power to external loads. This may be useful in situations where power is needed for the armed forces in the field, in humanitarian or disaster relief situations where transportation of a generator and fuel is challenging, or in situations where there is a request for power that is no longer available, to name a few.

Figure 13:
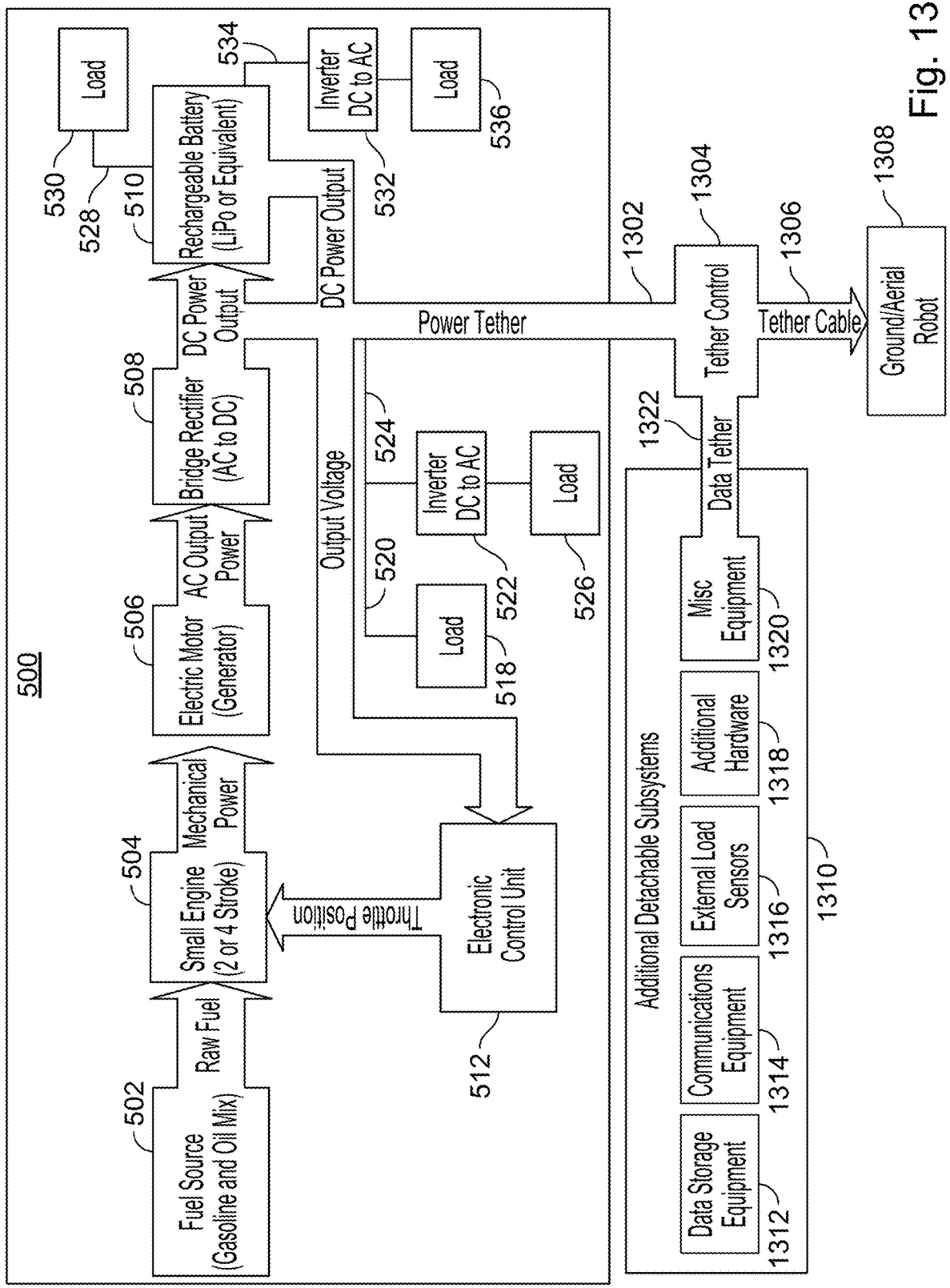
FIG. 13 shows a diagram of a hybrid generator system with detachable subsystems.
Figure 14:
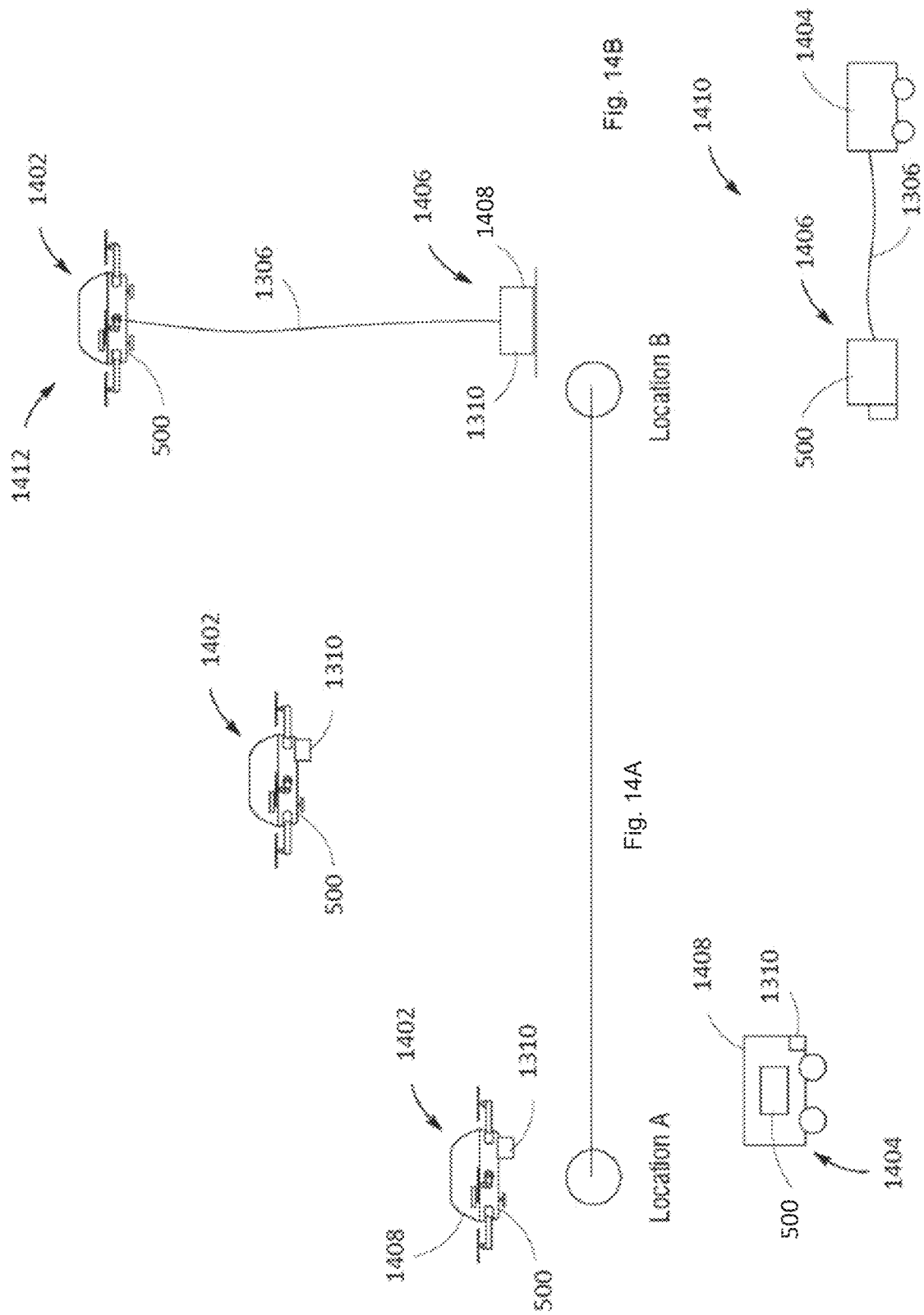
FIG. 14A shows a diagram of a hybrid generator system with detachable subsystems integrated as part of a UAV.
FIG. 14B shows a diagram of a hybrid generator system with detachable subsystems integrated as part of a ground robot.

FIG. 13 shows a diagram of another system for a hybrid generator system 500 with detachable subsystems. FIG. 14A shows a diagram of a hybrid generator system 500 with detachable subsystems integrated as part of a UAV. FIG. 14B shows a diagram of a hybrid generator system 500 with detachable subsystems integrated as part of a ground robot. In some examples, a tether line 1302 is coupled to the DC output of bride rectifier 508 and rechargeable battery 510 of a micro hybrid control system 500. The tether line 1302 can provide DC power output to a tether controller 1304. The tether controller 1304 is coupled between a tether cable 1306 and a ground or aerial robot 1308. In operation, as discussed in further detail below, the hybrid generator system 500 provides tethered power to the ground or aerial robot 1308 with the similar output capabilities as discussed above with one or more of the figures included herein, such as UAV 100 of FIG. 1.

The system shown in FIG. 13 can include additional detachable components 1310 integrated as part of the system. For example, the system can include data storage equipment 1312, communications equipment 1314, external load sensors 1316, additional hardware 1318, and various miscellaneous equipment 1320 that can be coupled via data tether 1322 to tether controller 1304.

In some examples of operation of the system shown in FIG. 13, the system may be configured as part of a flying robot or UAV, such as flying robot or UAV (1402 of FIG. 14A or UAV 100 of FIG. 1), or as ground robot 1404. Portable tethered robotic system 1408 may start a mission at location A. All or an applicable combination of the subsystems and ground, the tether controller, ground/aerial robot 1308 can be powered by the hybrid generator system 500. The portable tethered robotic system 1408 can travel either by ground (e.g., using ground robot 1404 powered by hybrid generator system 500) or by air (e.g., using flying robot or UAV 1402 powered by hybrid generator system 500) to desired remote location B. At location B, portable tethered robotic system 1408 configured as flying robot 1402 or ground robot 1404 can autonomously decouple hybrid generator system 500 and/or detachable subsystem 1310, indicated at 1406, which remain detached while ground robot 1404 or flying robot or UAV 1402 are operational. When flying robot or UAV 1402 is needed at location B, indicated at 1412, flying robot or UAV 1402 can be operated using power provided by hybrid generator system coupled to tether cable 1306. When flying robot or UAV 1402 no longer has hybrid generator system 500 and/or additional components 1310 attached thereto, it is significantly lighter and can be in flight for a longer period of time. In some examples, flying robot or UAV 1402 can take off and remain in a hovering position remotely for extended periods of time using the power provided by hybrid generator system 500.

Similarly, when ground robot 1404 is needed at location B, indicated at 1410, it may be powered by hybrid generator system 500 coupled to tether line 1306 and may also be significantly lighter without hybrid generator system 500 and/or additional components 1310 attached thereto. Ground robot 1404 can also be used for extended periods of time using the power provide by hybrid generator system 500.

Figure 15:
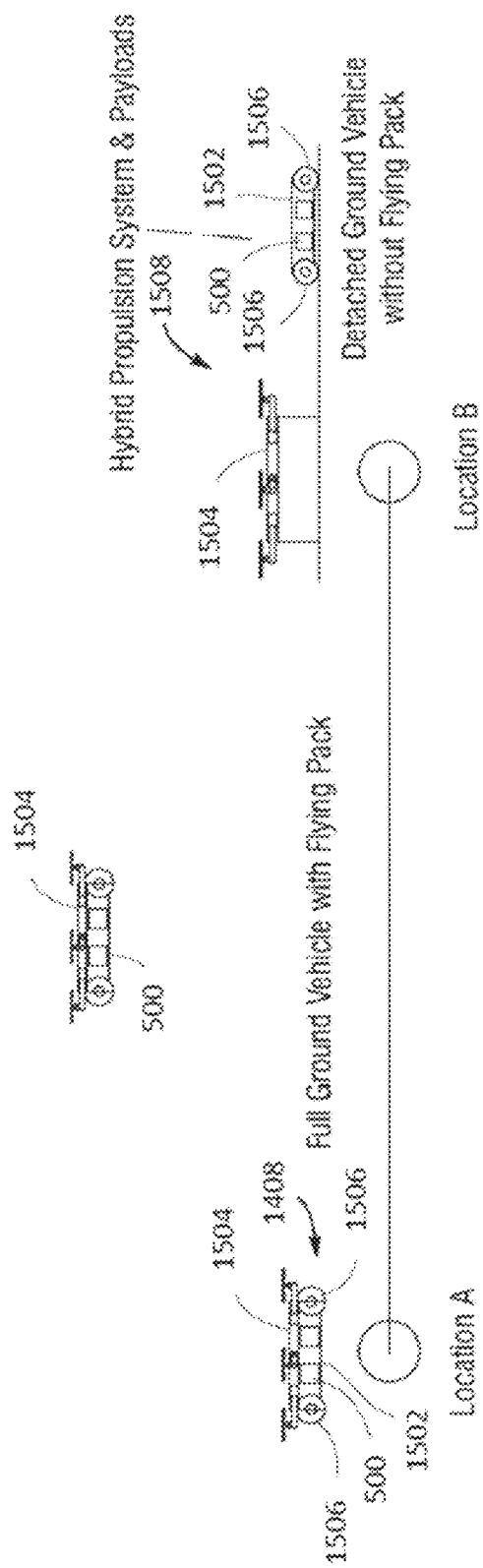
FIG. 15 shows a ground robot with a detachable flying pack in operation.

FIG. 15 shows a ground robot 1502 with a detachable flying pack 1504 in operation. The detachable flying pack 1504 includes hybrid generator system 500. The detachable flying pack 1504 is coupled to the ground robot 1502 of one or more embodiments. The hybrid generator system 500 is embedded within the ground robot 1502. The ground robot 1502 is detachable from the flying pack 1504. With such a design, a majority of the capability may be embedded deep within the ground robot 1502 which can operate 100% independently of the flying pack 1504. When the ground robot 1502 is attached to the flying pack 1504, the flying pack 1504 may be powered from hybrid generator system 500 embedded in the ground robot 1502 and the flying pack 1504 provides flight. The ground robot 1502 platform can be a leg wheel or threaded base motion.

In some examples, the ground robot 1502 may include the detachable flying pack 1504 and the hybrid generator system 500 coupled thereto as shown in FIG. 15. In the illustrated example, the ground robot 1502 is a wheel-based robot as shown by wheels 1506. In this example, the hybrid generator system 500 includes fuel source 502, engine 504, generator motor 506, bridge rectifier 508, rechargeable battery 20, ECU 512, and optional inverters 522 and 532, as discussed above with reference to one or more figures included herein. The hybrid generator system 500 also preferably includes data storage equipment 1312, communications equipment 1314, external load sensors 1316, additional hardware 1318, and miscellaneous communications 1320 coupled to data line 1322 as shown. The flying pack 1504 is preferably an aerial robotic platform such as a fixed wing, single rotor or multi rotor, aerial device, or similar type aerial device.

In some examples, the ground robot 1502 and the aerial flying pack 1504 are configured as a single unit. Power is delivered from hybrid generator system 500 and is used to provide power to flying pack 1504, so that ground robot 1502 and flying pack 1504 can fly from location A to location B. At location B, ground robot 1506 detaches from flying pack 1504, indicated at 1508, and is able to maneuver and operate independently from flying pack 1504. Hybrid generator system 500 is embedded in ground robot 1502 such that ground robot 1506 is able to be independently powered from flying pack 1504. Upon completion of the ground mission, ground robot 1502 is able to reattached itself to flying pack 1504 and return to location A. All of the above operations can be manual, semi-autonomous, or fully autonomous.

In some examples, flying pack 1504 can traverse to a remote location and deliver ground robot 1502. At the desired location, there may be no need for flying pack 1504. As such, it can be left behind so that ground robot 1502 can complete its mission without having to carry flying pack 1504 as its payload. This may be useful for traversing difficult and challenging terrains, remote locations, and in situations where it is challenging to transport ground robot 1502 to the location. Exemplary applications may include remote mine destinations, remote surveillance and reconnaissance, and package delivery services where flying pack 1504 cannot land near an intended destination. In these examples, a designated safe drop zone for flying pack can be used and local delivery is completed by ground robot 1502 to the destination.

In some examples, upon a mission being completed, ground robot 1404 or flying robot or UAV 1402 can be autonomously coupled back to hybrid generator system 500. In some implementations, such coupling is performed automatically upon the mission being completed. Additional detachable components 1310 can be autonomously coupled back hybrid generator system 500. Portable tethered robotic system 1408 with a hybrid generator system 500 configured a flying robot or UAV 1402 or ground robot 1404 then returns to location A using the power provided by hybrid generator system 500.

The result is portable tethered robotic system 1408 with a hybrid generator system 500 is able to efficiently transport ground robot 1404 or flying robot or UAV 1402 to remote locations, automatically decouple ground robot 1404 or flying robot or UAV 1402, and effectively operate the flying robot 1402 or ground robot 1404 using tether power where it may be beneficial to maximize the operation time of the ground robot 1402 or flying robot or UAV 1404. System 1408 provides modular detachable tethering which may be effective in reducing the weight of the tethered ground or aerial robot, thereby reducing its power requirements significantly. This allows the aerial robot or UAV or ground robot to operate for significantly longer periods of time when compared to the original capability where the vehicle components are attached and the vehicle needs to sustain motion. System 1408 eliminates the need to assemble a generator, robot and tether at remote locations and therefore saves time, resources, and expense. Useful applications of system 1408 may include, inter alia, remote sensing, offensive or defensive military applications and/or communications networking, multi-vehicle cooperative environments, and the like. In some implementations, one or more sensors of a navigation system (e.g., navigation system 110 of FIG. 1) can be attached to system 1408. The sensors can be configured to interface with portion of an unmanned aerial vehicle highway, such as to facilitate localization, path planning, or other operations of the vehicle.

Figure 16:
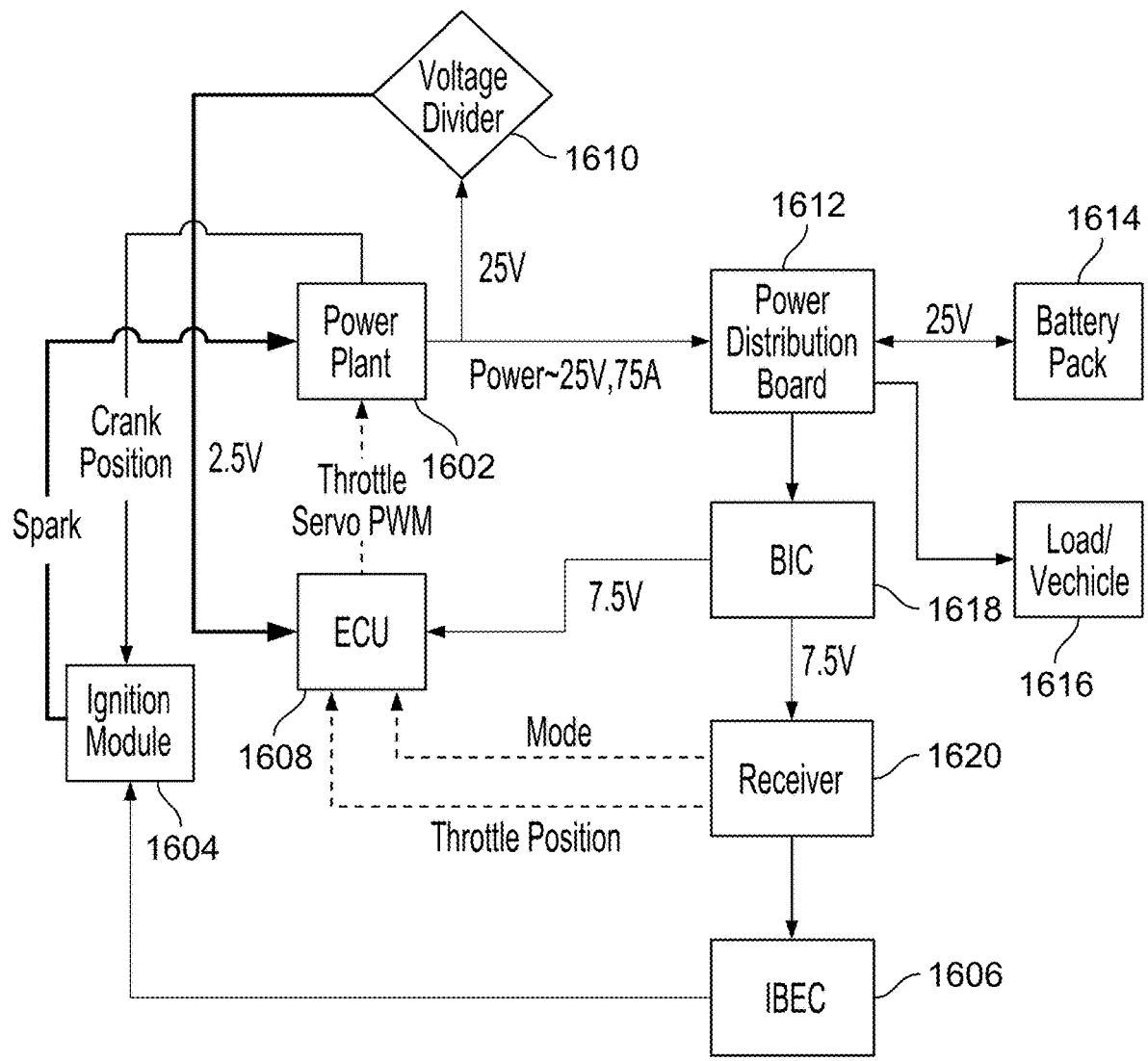
FIG. 16 shows a control system of a hybrid generator system.

FIG. 16 shows a control system of a hybrid generator system. The hybrid generator system includes a power plant 1602 coupled to an ignition module 1604. The ignition module 1604 functions to start the power plant 1602 by providing a physical spark to the power plant 1604. The ignition module 1604 is coupled to an ignition battery eliminator circuit (IBEC) 1606. The IBEC 1606 functions to power the ignition module 1604.

The power plant 1602 is configured to provide power. The power plant 1602 includes an engine and a generator. The power plant is controlled by the ECU 1608. The ECU 1608 is coupled to the power plant through a throttle servo. The ECU 1608 can operate the throttle servo to control a throttle of an engine to cause the power plant 1602 to either increase or decrease an amount of produced power. The ECU 1608 is coupled to a voltage divider 1610. Through the voltage divider 1610, the ECU can determine an amount of power the ECU 1608 is generating to determine whether to increase, decrease, or keep a throttle of an engine constant.

The power plant is coupled to a power distribution board 1612. The power distribution board 1612 can distribute power generated by the power plant 1602 to either or both a battery pack 1614 and a load/vehicle 1616. The power distribution board 1612 is coupled to a battery eliminator circuit (BEC) 1618. The BEC 1618 provides power to the ECU 1608 and a receiver 1620. The receiver 1620 controls the IBEC 1606 and functions to cause the IBEC 1606 to power the ignition module 1604. The receiver 1620 also sends information to the ECU 1608 used in controlling a throttle of an engine of the power plant 1602. The receiver 1620 sends information to the ECU related to a throttle position of a throttle of an engine and a mode in which the micro hybrid generation system is operating.

The power distribution board 1612 is configured to power the navigation system (e.g., navigation system 110 described in relation to FIG. 1). The power distribution board includes one or more voltage regulators that step down the voltage to power one or more sensors of the navigation system. The navigation system can thus draw as much power as needed from the micro hybrid power generator of the UAV.

Figure 17:
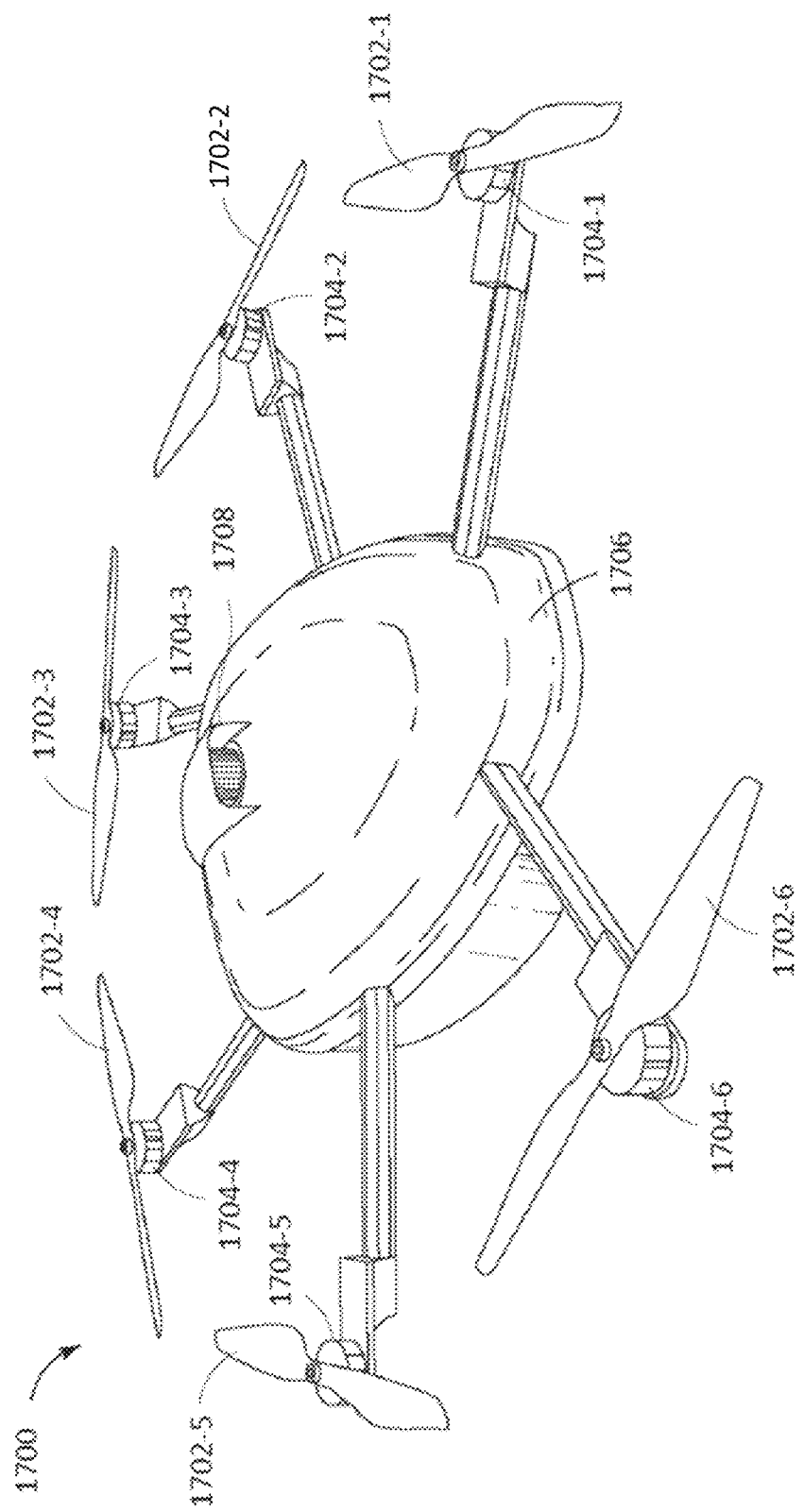
FIGS. 17-19 show diagrams of a UAV.

FIG. 17 shows a top perspective view of a top portion 1700 of a drone powered through a hybrid generator system. The top portion 1700 of the drone shown in FIG. 13 includes six rotors 1702-1 through 1702-6 (hereinafter "rotors 1702"). The rotors 1702 are caused to spin by corresponding motors 1704-1 through 1704-6 (hereinafter "motors 1704"). The motors 1704 can be powered through a hybrid generator system. The top portion 1700 of a drone includes a top surface 1706. Edges of the top surface 1706 can be curved to reduce air drag and improve aerodynamic performance of the drone. The top surface includes an opening 1708 through which air can flow to aid in dissipating heat away from at least a portion of a hybrid generator system. In various embodiments, at least a portion of an air filter is exposed through the opening 1708.

Figure 18:
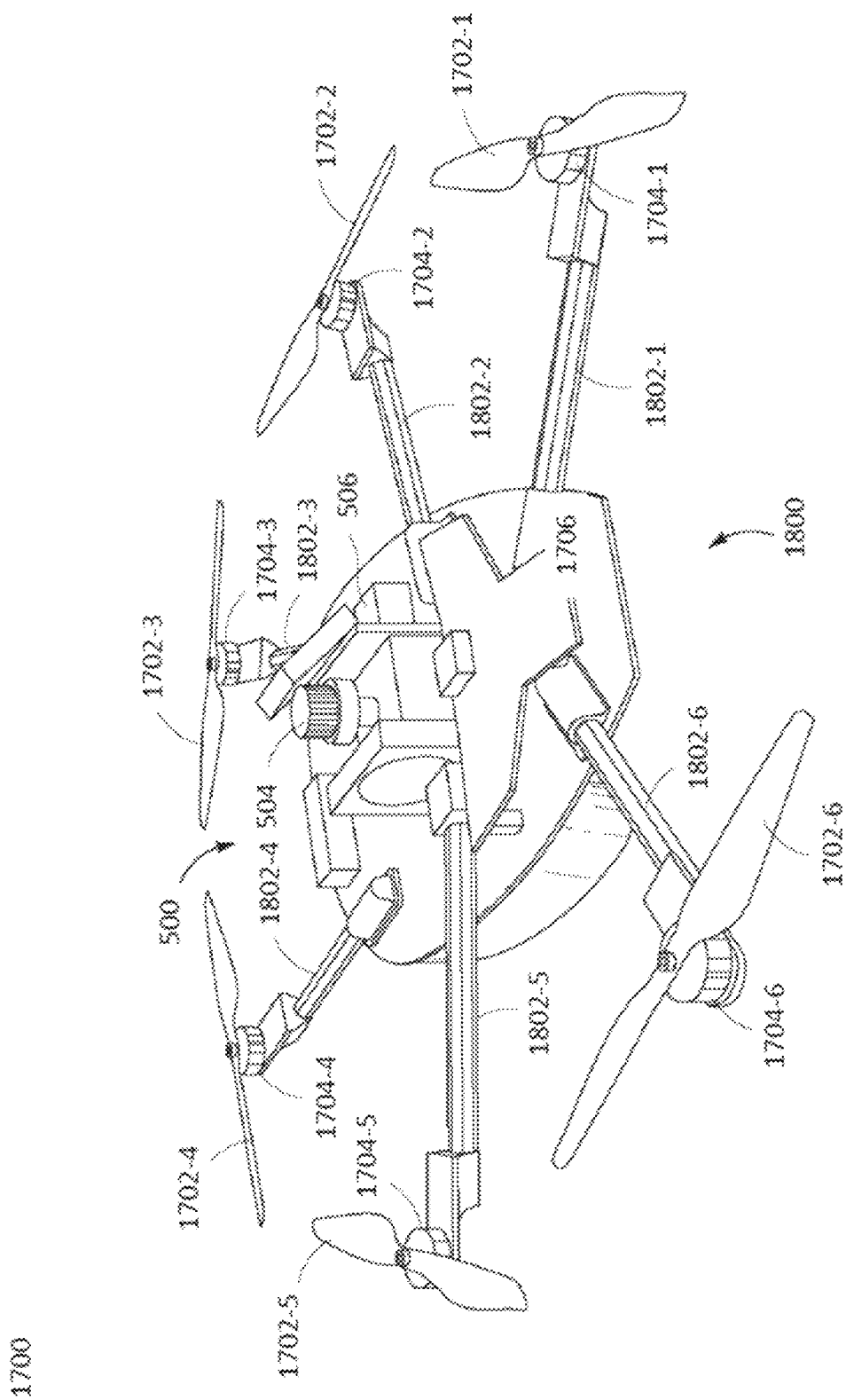

FIG. 18 shows a top perspective view of a bottom portion 1800 of a drone powered through a hybrid generator system 500. The hybrid generator system 500 includes an engine 504 and a generator motor 506 to provide power to motors 1704. The rotor motors 1704 and corresponding rotors 1702 are positioned away from a main body of a bottom portion 1800 of the drone through arms 1802-1 through 1802-6 (hereinafter "arms 1802"). An outer surface of the bottom portion of the bottom portion 1800 of the drone and/or the arms 1802 can have edges that are curved to reduce air drag and improve aerodynamic performance of the drone.

Figure 19:
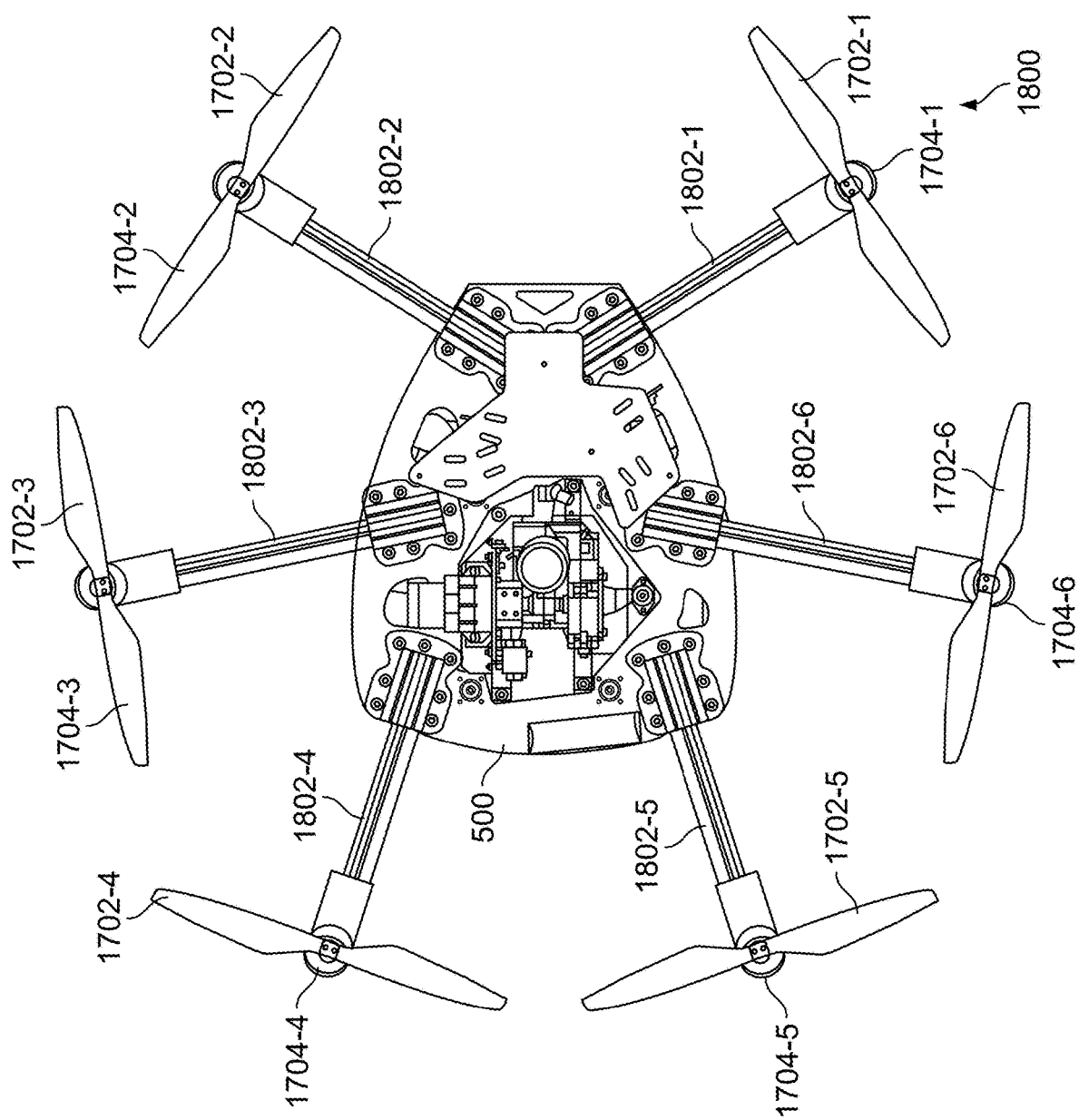

FIG. 19 shows a top view of a bottom portion 1800 of a drone powered through a hybrid generator system 500. The rotor motors 1704 and corresponding rotors 1702 are positioned away from a main body of a bottom portion 1800 of the drone through arms 1802. An outer surface of the bottom portion of the bottom portion 1800 of the drone and/or the arms 1802 can have edges that are curved to reduce air drag and improve aerodynamic performance of the drone.

Figure 20:
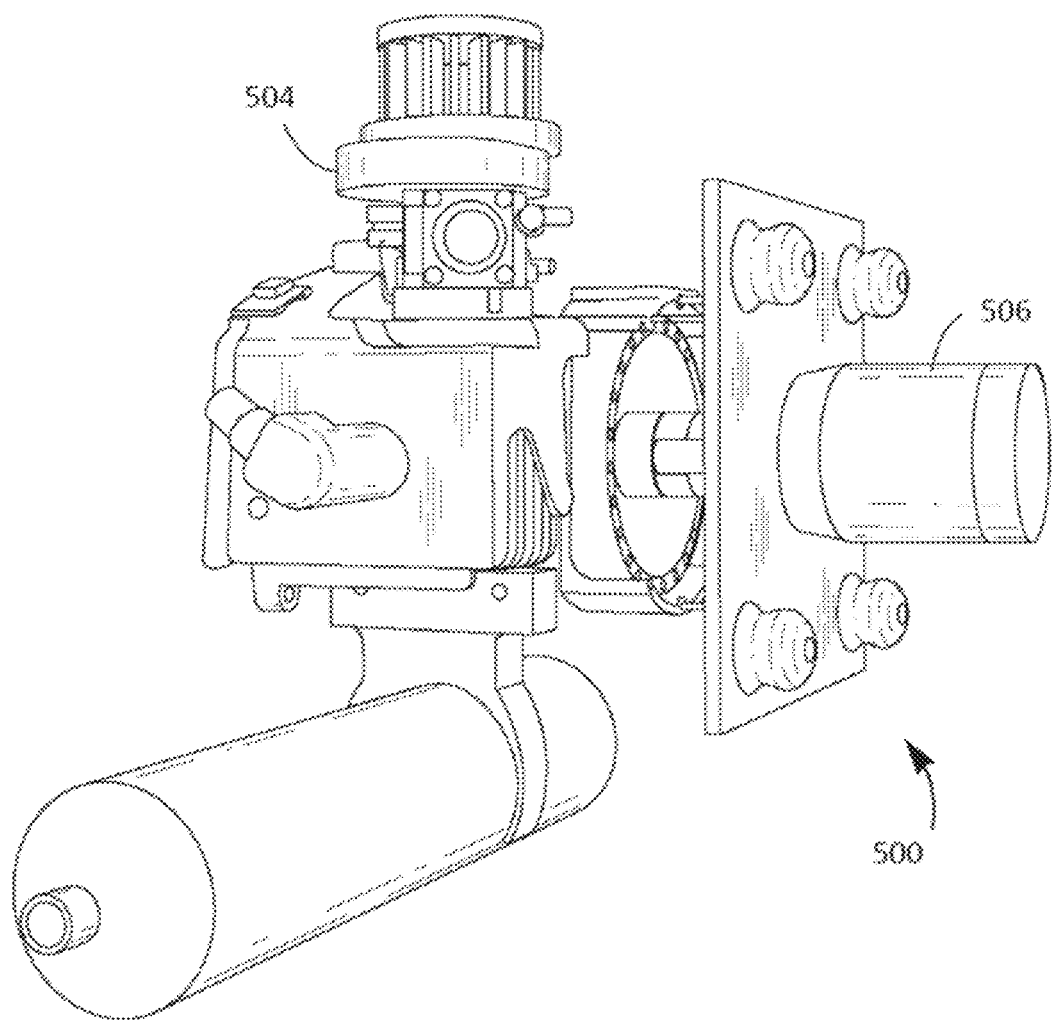
FIGS. 20 and 21 show diagrams of portions of a hybrid generator system.

FIG. 20 shows a side perspective view of a hybrid generator system 500. The hybrid generator system 500 shown in FIG. 16 is capable of providing 1.8 kW of power. The hybrid generator system 500 include an engine 504 coupled to a generator motor 506. The engine 504 can provide approximately 3 horsepower. The generator motor 506 functions to generate AC output power using mechanical power generated by the engine 504.

Figure 21:
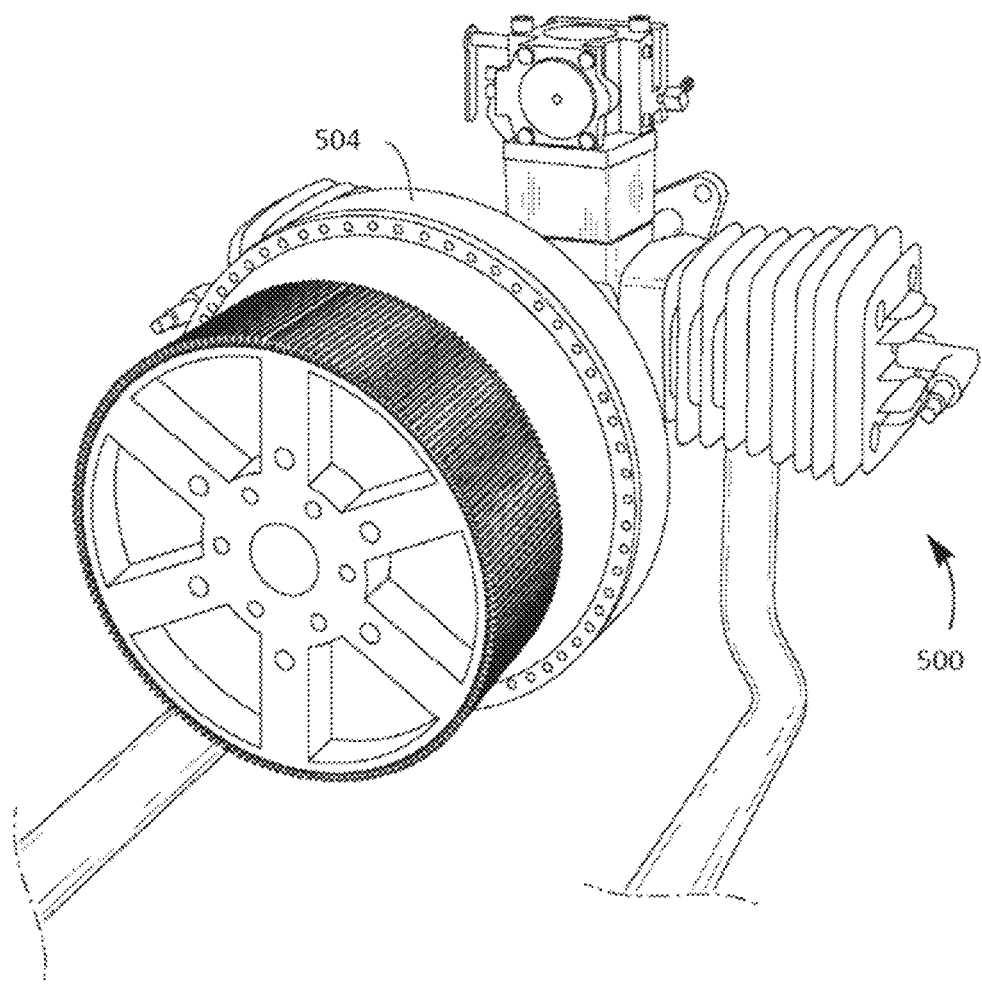

FIG. 21 shows a side perspective view of a hybrid generator system 500. The hybrid generator system 500 shown in FIG. 17 is capable of providing 10 kW of power. The hybrid generator system 500 include an engine 504 coupled to a generator motor. The engine 504 can provide approximately 15-16.5 horsepower. The generator motor functions to generate AC output power using mechanical power generated by the engine 504.

Further description of UAVs and hybrid generator systems can be found in U.S. application Ser. No. 14/942,600, filed on Nov. 16, 2015, the contents of which are incorporated here by reference in their entirety.

In some examples, the engine 504 can include features that enable the engine to operate with high power density. The engine 504 can be a two-stroke engine having a high power-to-weight ratio. The engine 504 can embody a simply design with a number of moving parts such that the engine is small and light, thus contributing to the high power-to-weight ratio of the engine. In some examples, the engine may have an energy density of 1 kW/kg (kilowatt per kilogram) and generate about 10 kg of lift for every kilowatt of power generated by the engine. In some examples, the engine 504 can be a brushless motor, which can contribute to achieving a high power density of the engine. A brushless motor is efficient and reliable, and is generally not prone to sparking, thus reducing the risk of electromagnetic interference (EMI) from the engine.

In some examples, the engine 504 is mounted on the UAV via a vibration isolation system that enables sensitive components of the UAV to be isolated from vibrations generated by the engine. Sensitive components of the UAV can include, e.g., an inertial measurement unit such as Pixhawk, a compass, a global positioning system (GPS), or other components.

In some examples, the vibration isolation system can include vibration damping mounts that attach the engine 504 to the frame of the UAV. The vibration damping mounts allow for the engine 504 to oscillate independently from the frame of the UAV, thus preventing vibrations from being transmitted from the engine to other components of the UAV. The vibration damping mounts can be formed from a robust, energy absorbing material such as rubber, that can absorb the mechanical energy generated by the motion of the engine without tearing or ripping, thus preventing the mechanical energy from being transferred to the rest of the UAV. In some examples, the vibration damping mounts can be formed of two layers of rubber dampers joined together rigidly with a spacer. The length of the spacer can be adjusted to achieve a desired stiffness for the mount. The hardness of the rubber can be adjusted to achieve desired damping characteristics in order to absorb vibrational energy.

Figure 22A:
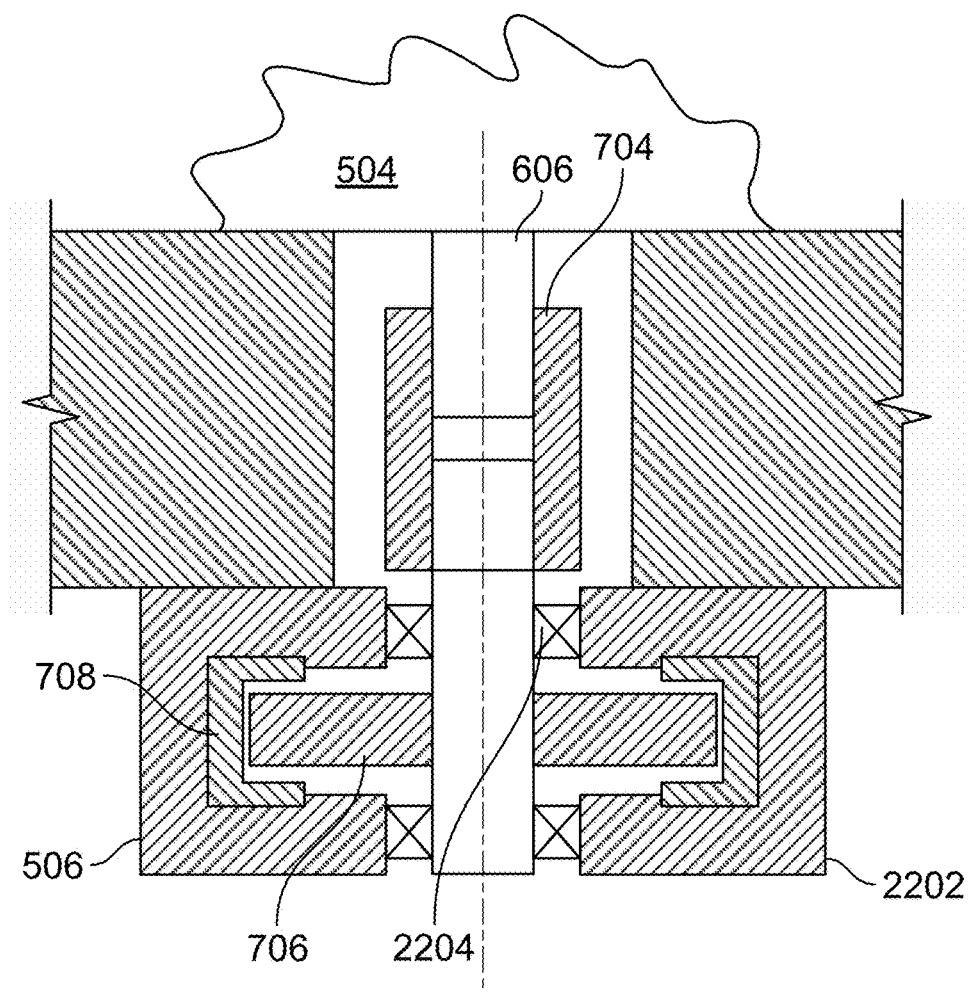
FIGS. 22A and 22B show diagrams of portions of a hybrid generator system.

Referring to FIG. 22A, in some examples, the engine 504 and the generator motor 506 are directly coupled through a precise and robust connection (e.g., through a urethane coupling 704). In particular, the generator motor 506 includes a generator rotor 706 and a generator stator 708 housed in a generator body 2202. The generator rotor 706 is attached to the generator body 2202 by generator bearings 2204. The generator rotor 706 is coupled to an engine shaft 606 via the coupling 704. Precision coupling between the engine 504 and the generator motor 506 can be achieved by using precisely machined parts and balancing the weight and support of the rotating components of the generator motor 506, which in turn reduces internal stresses. Alignment of the generator rotor 706 with the engine shaft 606 can also help to achieve precision coupling. Misalignment between the rotor 706 and the engine shaft 606 can cause imbalances that can reduce efficiency and potentially lead to premature failure. In some examples, alignment of the rotor 706 with the engine shaft 606 can be achieved using precise indicators and fixtures. Precision coupling can be maintained by cooling the engine 504 and generator motor 506, by reducing external stresses, and by running the engine 504 and generator motor 506 under steady conditions, to the extent possible. For instance, the vibration isolation mounts allow external stresses on the engine 504 to be reduced or substantially eliminated, assisting in achieving precision direct coupling.

Direct coupling can contribute to the reliability of the first power system, which in turn enables the hybrid generator system to operate continuously for long periods of time at high power. In addition, direct coupling can contribute to the durability of the first power system, thus helping to reduce mechanical creep and fatigue even over many engine cycles (e.g., millions of engine cycles). In some examples, the engine is mechanically isolated from the frame of the UAV by the vibration isolation system and thus experiences minimal external forces, so the direct coupling between the engine and the generator motor can be implemented by taking into account only internal stresses.

Direct coupling between the engine 504 and the generator motor 506 can enable the first power system to be a compact, lightweight power system having a small form factor. A compact and lightweight power system can be readily integrated into the UAV.

Figure 22B:
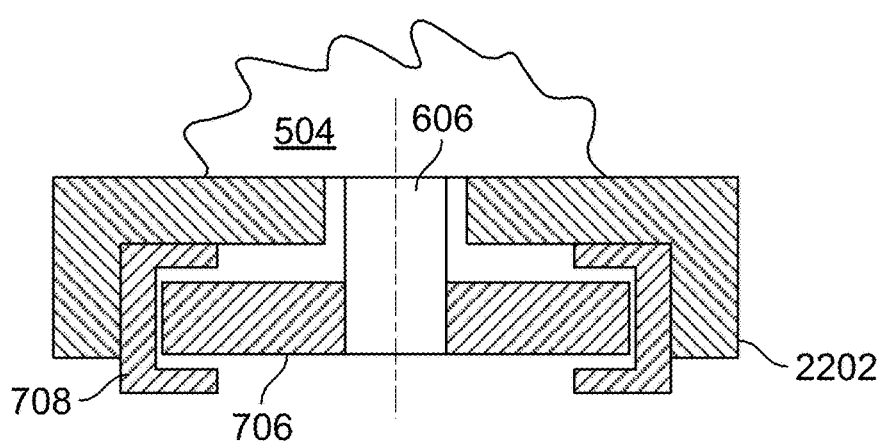

Referring to FIG. 22B, in some examples, a frameless or bearing-less generator 608 can be used instead of a urethane coupling between the generator motor 506 and the engine 504. For instance, the bearings (2204 in FIG. 22A) on the generator can be removed and the generator rotor 706 can be directly mated to the engine shaft 606. The generator stator 708 can be fixed to a frame 610 of the engine 516. This configuration prevents over-constraining the generator with a coupling while providing a small form factor and reduced weight and complexity.

In some examples, the generator motor 506 includes a flywheel that provides a large rotational moment of inertia. A large rotational inertia can result in reduced torque spikes and smooth power output, thus reducing wear on the coupling between the engine 504 and the generator motor 506 and contributing to the reliability of the first power system. In some examples, the generator, when mated directly to the engine 504, acts as a flywheel. In some examples, the flywheel is a distinct component (e.g., if the generator does not provide enough rotary inertia).

In some examples, design criteria are set to provide good pairing between the engine 504 and the generator motor 506. The power band of a motor is typically limited to a small range. This power band can be used to identify an RPM (revolutions per minute) range within which to operate under most flight conditions. Based on the identified RPM range, a generator can be selected that has a motor constant (kV) that is able to provide the appropriate voltage for the propulsion system (e.g., the rotors). The selection of an appropriate generator helps to ensure that the voltage out of the generator will not drop as the load increases. For instance, if the engine has maximum power at 6500 RPM, and a 50 V system is desired for propulsion, then a generator can be selected that has a kV of 130.

In some examples, exhaust pipes can be designed to positively affect the efficiency of the engine 504. Exhaust pipes serve as an expansion chamber for exhaust from the engine, thus improving the volumetric efficiency of the engine. The shape of the exhaust pipes can be tuned to guide air back into the combustion chamber based on the resonance of the system. In some examples, the carburetor can also be tuned based on operating parameters of the engine, such as temperature or other parameters. For instance, the carburetor can be tuned to allow a desired amount of fuel into the engine, thus enabling a target fuel to air ratio to be reached in order to achieve a good combustion reaction in the engine. In addition, the throttle body can be designed to control fuel injection and/or timing in order to further improve engine output.

In some examples, the throttle of the engine can be regulated in order to achieve a desired engine performance. For instance, when the voltage of the system drops under a load, the throttle is increased; when the voltage of the system becomes too high, the throttle is decreased. The bus voltage can be regulated and a feedback control loop used to control the throttle position. In some examples, the current flow into the battery can be monitored with the goal of controlling the charge of the battery and the propulsion voltage. In some examples, feed forward controls can be provided such that the engine can anticipate upcoming changes in load (e.g., based on a mission plan and/or based on the load drawn by the motor) and preemptively compensates for the anticipated changes. Feed forward controls can enable the engine to respond to changes in load with less lag. In some examples, the engine can be controlled to charge the battery according to a pre-specified schedule, e.g., to maximize battery life, in anticipation of loads (e.g., loads forecast in a mission plan), or another goal. Throttle regulation can help keep the battery fully charged, helping to ensure that the system can run at a desired voltage and helping to ensure that backup power is available.

In some examples, ultra-capacitors can be incorporated into the hybrid generator system in order to allow the hybrid generator system to respond quickly to changing power demands. For instance, ultra-capacitors can be used in conjunction with one or more rechargeable batteries to provide a lightweight system capable of rapid response and smooth, reliable power.

In some examples, thermal management strategies can be employed in order to actively or passively cool components of the hybrid generator system. High power density components tend to overheat (e.g., because thermal dissipation is usually proportional to surface area). In addition, internal combustion is an inherently inefficient process, which creates heat.

Figure 23:
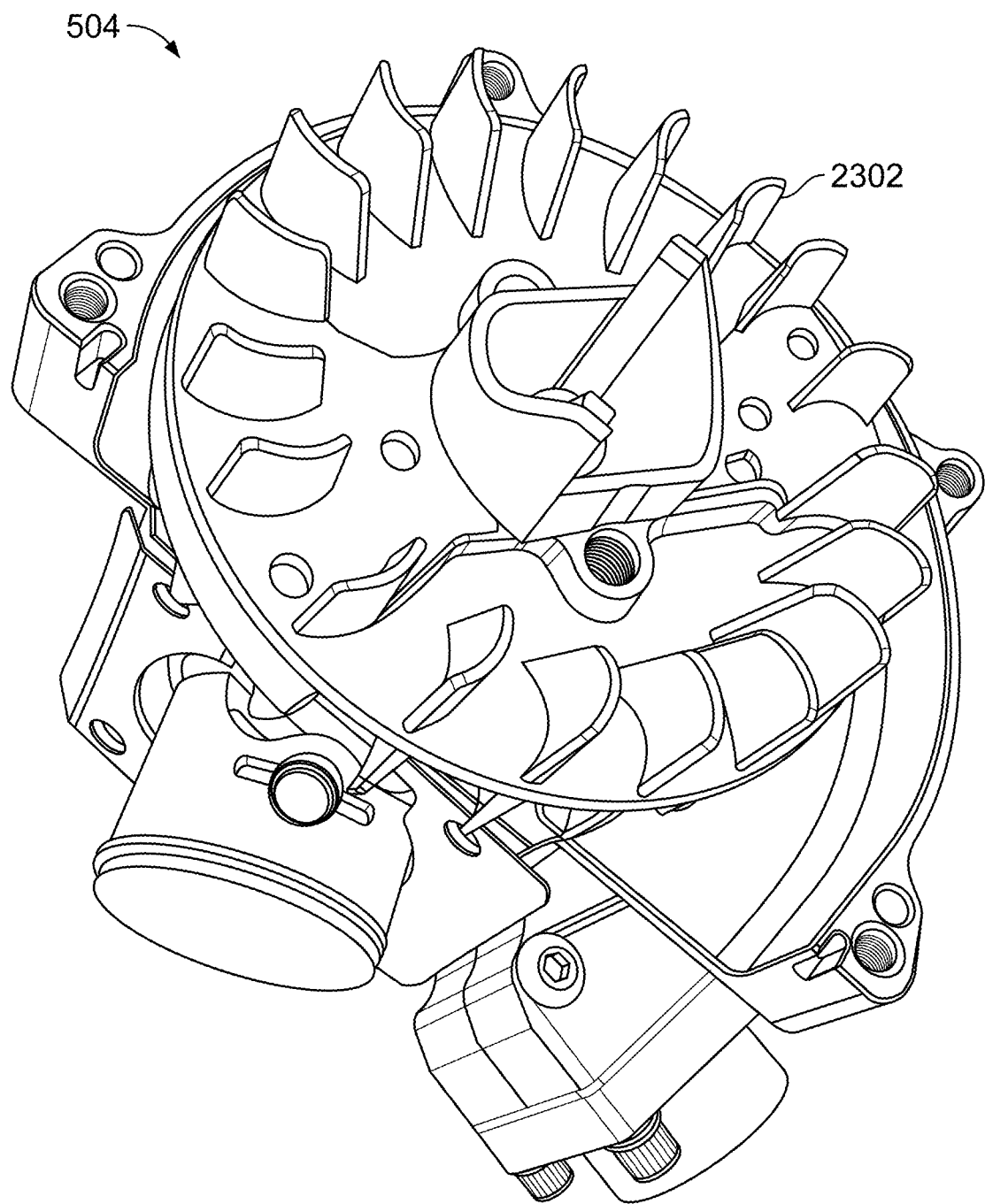
FIG. 23 shows a diagram of a portion of an engine.

Active cooling strategies can include fans, such as a centrifugal fan. The centrifugal fan can be coupled to the engine shaft so that the fan spins at the same RPM as the engine, thus producing significant air flow. The centrifugal fan can be positioned such that the air flow is directed over certain components of the engine (e.g., the hottest parts of the engine) such as the cylinder heads. Air flow generated by the flying motion of the UAV can also be used to cool the hybrid generator system. For instance, air pushed by the rotors of the UAV (referred to as propwash) can be used to cool components of the hybrid generator system. Passive cooling strategies can be used alone or in combination with active cooling strategies in order to cool components of the hybrid generator system. In some examples, one or more components of the hybrid generator system can be positioned in contact with dissipative heat sinks, thus reducing the operating temperature of the components. For instance, the frame of the UAV can be formed of a thermally conductive material, such as aluminum, which can act as a heat sink. Referring to FIG. 23, in some examples, fins 2302 can be formed on the engine (e.g., on one or more of the cylinder heads of the engine) to increase the convective surface area of the engine, thus enabling increased heat transfer. In some examples, the hybrid generator system can be configured such that certain components are selectively exposed to ambient air or to air flow generated by the flying motion of the UAV in order to further cool the components.

In some examples, the materials of the hybrid generator system 500 and/or the UAV can be lightweight. For instance, materials with a high strength to weight ratio can be used to reduce weight. Example materials can include aluminum or high strength aluminum alloys (e.g., 7075 alloy), carbon fiber based materials, or other materials. Component design can also contribute to weight reduction. For instance, components can be designed to increase the stiffness and reduce the amount of material used for the components. In some examples, components can be designed such that material that is not relevant for the functioning of the component is removed, thus further reducing the weight of the component.

While the UAV has been largely described as being powered by a hybrid generator system that includes a gasoline powered engine coupled to a generator motor, other types of power systems may also be used. In some implementations, the UAV may be powered at least in part by a turbine, such as a gasoline turbine. For example, a gasoline turbine can be used in place of the gasoline powered engine. The gasoline turbine may be one of two separate power systems included as part of the hybrid generator system. That is, the hybrid generator system can include a first power system in the form of a gasoline turbine and a second power system in the form of a generator motor. The gasoline turbine may be coupled to the generator motor.

The gasoline turbine may provide higher RPM levels than those provided by a gasoline powered engine (e.g., the engine 504 described above). Such higher RPM capability may allow a second power system (e.g., the generator motor 506 described above) to generate electricity (e.g., for charging the battery 510 described above) more quickly and efficiently.

The gasoline turbine, sometimes referred to as a combustion turbine, may include an upstream rotation compressor coupled to a downstream turbine with a combustion chamber there-between. The gasoline turbine may be configured to allow atmospheric air to flow through the compressor, thereby increasing the pressure of the air. Energy may then be added by applying (e.g., spraying) fuel, such as gasoline, into the air and igniting the fuel in order to generate a high-temperature flow. The high-temperature and high-pressure gas flow may then enter the turbine, where the gas flow can expand down to the exhaust pressure, thereby producing a shaft work output. The turbine shaft work is then used to drive the compressor and other devices, such as a generator (e.g., the generator motor 504) that may be coupled to the shaft. Energy that is not used for shaft work can be expelled as exhaust gases having one or both of a high temperature and a high velocity. One or more properties and/or dimensions of the gas turbine design can be chosen such that the most desirable energy form is maximized. In the case of use with a UAV, the gas turbine will typically be optimized to produce thrust from the exhaust gas or from ducted fans connected to the gas turbines.

A number of embodiments have been described. Nevertheless, it will be understood that various modifications may be made without departing from the spirit and scope of the subject matter described herein. Other such embodiments are within the scope of the following claims.

What is claimed is:

1. An unmanned vehicle comprising:
   at least one navigation sensor configured to measure navigation data indicative of an environment;
   at least one status sensor configured to measure status data indicative of operating parameters of a hardware system of the unmanned vehicle, the navigation data and the status data being measured data;
   a computing system comprising:
      a navigation engine comprising one or more processors configured to receive the navigation data and status data and plan a path through the environment;
      a security engine comprising one or more processors configured to:
         detect an unauthorized attempt by an unauthorized user to access the navigation data or the status data;
         send an alert to an authorized user indicative of the unauthorized access attempt;
         request simulated data including one or both of simulated navigation data and simulated status data from the navigation engine, wherein the simulated data is generated to correspond to commands received from the unauthorized user;
         select, from among the measured data and the simulated data, at least a portion of the simulated data for sending to the unauthorized user;
         send, to the unauthorized user, the selected simulated data including the one or both of the simulated navigation data and the simulated status data;
         select, from among the measured data and the simulated data, at least a portion of the measured data; and
         send, to the authorized user, the selected measured data.

2. The unmanned vehicle of claim 1, wherein the hardware system comprises:
   an engine configured to generate mechanical energy;
   a generator motor coupled to the engine and configured to generate electrical energy from the mechanical energy generated by the engine; and
   at least one rotor motor configured to drive at least one propeller of the unmanned vehicle to rotate, wherein the at least one rotor motor is powered by the electrical energy generated by the generator motor,
   wherein the navigation engine is powered by the electrical energy generated by the generator motor.

3. The unmanned vehicle of claim 1, further comprising a storage comprising a plurality of security tiers, a first security tier of the plurality having a first level of data security and a second security tier having a second level of data security that has at least one additional security requirement relative to the first level of data security.

4. The unmanned vehicle of claim 3, wherein the storage is configured to store the navigation data in the first security tier and the status data in the second security tier.

5. The unmanned vehicle of claim 3, wherein the second level of data security of the second security tier comprises at least one additional authentication requirement to access data stored in the second security tier relative to authentication requirements of the first level of data security of the first security tier.

6. The unmanned vehicle of claim 3, wherein the second level of data security of the second security tier comprises a requirement of physical access to the unmanned vehicle to access data stored in the second security tier, and wherein the first level of data security of the first security tier comprises permission to remotely access data stored in the first security tier.

7. The unmanned vehicle of claim 1, wherein the security engine is further configured to:
   monitor transmissions received from the unauthorized user; and
   classify a type of a cyberattack being used by the unauthorized user.

8. The unmanned vehicle of claim 7, wherein classifying the type of the cyberattack being used by the unauthorized user comprises:
   training a machine learning engine with training data comprising transmissions received during a plurality of different cyberattacks;
   inputting the transmissions received from the unauthorized user into the machine learning engine; and
   receiving, from the machine learning engine, data indicative of the type of the cyberattack being used by the unauthorized user.

9. The unmanned vehicle of claim 1, wherein the security engine comprises a virtual machine, and wherein sending the simulated data comprises:
   performing, in the virtual machine, a simulation of navigating the unmanned vehicle in response to data received from the unauthorized user to generate the simulation data; and
   sending the data received from the unauthorized user to the authorized user.

10. The unmanned vehicle of claim 9, wherein performing the simulation of navigating the unmanned vehicle in response to data received from the unauthorized user to generate the simulation data comprises:
    simulating the unmanned vehicle using a digital twin of the unmanned vehicle;
    simulating an environment within which the unmanned vehicle exists; and
    navigating the digital twin of the unmanned vehicle within the simulated environment.

11. The unmanned vehicle of claim 1, wherein detecting that an unauthorized user is attempting to access the navigation data or the status data comprises determining that the unmanned vehicle is deviating from a flight plan.

12. The unmanned vehicle of claim 1, wherein detecting that an unauthorized user is attempting to access the navigation data or the status data comprises determining that at least one value of the status data or the navigational data deviates from an acceptable range.

13. The unmanned vehicle of claim 12, wherein the acceptable range is user-specific and is determined based on previous navigation data or previous status data associated with a particular authorized user.

14. The unmanned vehicle of claim 1, wherein detecting that an unauthorized user is attempting to access the navigation data or the status data comprises testing at least one status sensor or at least one navigational sensor to identify data spoofing.

15. The unmanned vehicle of claim 1, wherein detecting that an unauthorized user is attempting to access the navigation data or the status data comprises determining that a particular pattern of requests for navigational data or status data is indicative of a cyberattack.

16. The unmanned vehicle of claim 1, wherein the status data comprises, at least one of temperature data, a voltage output, an electrical current output, vibrational data, tachometric output, and a log of control commands.

17. The unmanned vehicle of claim 1, wherein the navigational data comprises at least one of camera data, accelerometer data, gyroscopic data, ranging data, and global positioning system (GPS) coordinates.

18. A method for operating an unmanned vehicle, the method comprising:
receiving, by a computing system, navigation data indicative of an environment of the unmanned vehicle and status data indicative of operating parameters of a hardware system of the unmanned vehicle, the navigation data and the status data being measured data;
detecting, by the computing system, that an unauthorized user is attempting to access the navigation data or the status data;
sending an alert to an authorized user indicating that the unauthorized user is attempting to access navigation data or status data;
generating simulated data including one or both of simulated navigation data and simulated status data, the simulated data being generated to correspond to commands received from the unauthorized user;
selecting, from among the measured data and the simulated data, at least a portion of the simulated data for sending to the unauthorized user;
sending, to the unauthorized user, the simulated data including the one or both of the simulated navigation data and the simulated status data;
selecting, from among the measured data and the simulated data, at least a portion of the measured data; and
sending, to the authorized user, the selected measured data.

19. The method of claim 18, wherein the hardware system comprises:
an engine configured to generate mechanical energy;
a generator motor coupled to the engine and configured to generate electrical energy from the mechanical energy generated by the engine; and
at least one rotor motor configured to drive at least one propeller of the unmanned vehicle to rotate, wherein the at least one rotor motor is powered by the electrical energy generated by the generator motor,
wherein the navigation engine is powered by the electrical energy generated by the generator motor.

20. The method of claim 18, further comprising storing, in a storage comprising a plurality of security tiers, the navigation data and the status data, the storage comprising a first security tier of the plurality having a first level of data security and a second security tier having a second level of data security that has at least one additional security requirement relative to the first level of data security.

21. The method of claim 20, wherein the storage is configured to store the navigation data in the first security tier and the status data in the second security tier.

22. The method of claim 20, wherein the second level of data security of the second security tier comprises at least one additional authentication requirement to access data stored in the second security tier relative to authentication requirements of the first level of data security of the first security tier.

23. The method of claim 20, wherein the second level of data security of the second security tier comprises a requirement of physical access to the unmanned vehicle to access data stored in the second security tier, and wherein the first level of data security of the first security tier comprises permission to remotely access data stored in the first security tier.

24. The method of claim 18, further comprising:
monitoring, by the computing system, transmissions received from the unauthorized user; and
classifying, by the computing system, a type of a cyberattack being used by the unauthorized user.

25. The method of claim 24, wherein classifying the type of the cyberattack being used by the unauthorized user comprises:
training a machine learning engine with training data comprising transmissions received during a plurality of different cyberattacks;
inputting the transmissions received from the unauthorized user into the machine learning engine; and
receiving, from the machine learning engine, data indicative of the type of the cyberattack being used by the unauthorized user.

26. The method of claim 18, wherein sending the simulated data comprises:
performing, in a virtual machine of the computing system, a simulation of navigating the unmanned vehicle in response to data received from the unauthorized user to generate the simulation data; and
sending the data received from the unauthorized user to the authorized user.

27. The method of claim 26, wherein performing the simulation of navigating the unmanned vehicle in response to data received from the unauthorized user to generate the simulation data comprises:
simulating the unmanned vehicle using a digital twin of the unmanned vehicle;
simulating an environment within which the unmanned vehicle exists; and
navigating the digital twin of the unmanned vehicle within the simulated environment.

28. The method of claim 18, wherein detecting that an unauthorized user is attempting to access the navigation data or the status data comprises determining that the unmanned vehicle is deviating from a flight plan.

29. The method of claim 18, wherein detecting that an unauthorized user is attempting to access the navigation data or the status data comprises determining that at least one value of the status data or the navigational data deviates from an acceptable range.

30. The method of claim 29, wherein the acceptable range is user-specific and is determined based on previous navigation data or previous status data associated with a particular authorized user.

31. The method of claim 18, wherein detecting that an unauthorized user is attempting to access the navigation data or the status data comprises testing at least one status sensor or at least one navigational sensor to identify data spoofing.

32. The method of claim 18, wherein detecting that an unauthorized user is attempting to access the navigation data or the status data comprises determining that a particular pattern of requests for navigational data or status data is indicative of a cyberattack.

33. The method of claim 18, wherein the status data comprises, at least one of temperature data, a voltage output, an electrical current output, vibrational data, tachometric output, and a log of control commands.

34. The method of claim 18, wherein the navigational data comprises at least one of camera data, accelerometer data, gyroscopic data, ranging data, and global positioning system (GPS) coordinates.

* * * * *